US009749466B2

(12) United States Patent
Homma et al.

(10) Patent No.: US 9,749,466 B2
(45) Date of Patent: Aug. 29, 2017

(54) TRANSMISSION SYSTEM, TRANSMISSION TERMINAL, AND TRANSMISSION METHOD

(71) Applicants: Takeshi Homma, Kanagawa (JP); Takahiro Asai, Kanagawa (JP); Yuya Akimoto, Tokyo (JP)

(72) Inventors: Takeshi Homma, Kanagawa (JP); Takahiro Asai, Kanagawa (JP); Yuya Akimoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 71 days.

(21) Appl. No.: 14/822,216

(22) Filed: Aug. 10, 2015

(65) Prior Publication Data
US 2016/0050314 A1    Feb. 18, 2016

(30) Foreign Application Priority Data

Aug. 18, 2014    (JP) .................................. 2014-165999

(51) Int. Cl.
*H04M 3/42* (2006.01)
*H04M 1/725* (2006.01)
(Continued)

(52) U.S. Cl.
CPC ...... *H04M 3/42374* (2013.01); *G06Q 10/107* (2013.01); *H04L 67/18* (2013.01);
(Continued)

(58) Field of Classification Search
CPC ......... H04M 3/42374; H04M 3/42365; H04M 3/565; H04M 3/42357; H04M 1/72563;
(Continued)

(56) References Cited

U.S. PATENT DOCUMENTS 8,587,402 B2 * 11/2013 O'Shaughnessy ........................ H04M 1/72569
340/286.02
8,769,001 B2    7/2014 Ohwada
(Continued)

FOREIGN PATENT DOCUMENTS

EP    2 309 688 A1    4/2011
JP    2003-110668    4/2003
(Continued)

OTHER PUBLICATIONS

Extended European Search Report issued Jan. 22, 2016 in Patent Application No. 15180542.1.

*Primary Examiner* — Shahriar Behnamian
(74) *Attorney, Agent, or Firm* — Oblon, McClelland, Maier & Neustadt, L.L.P.

(57) ABSTRACT

A transmission system includes one or more processors that cause a source transmission terminal to transmit data to a destination transmission terminal, the processors including a receiving unit that receives availability information generated based on a current place of a destination candidate, a displaying unit that displays the availability information on a display to allow a user to determine whether transmitting the data to a destination transmission terminal associated with the destination candidate is appropriate, an operation reception unit that receives a selection of the destination candidate corresponding to the availability information displayed, and a transmission unit that transmits the data to the destination transmission terminal associated with the destination candidate the selection of which is received by the operation reception unit.

15 Claims, 21 Drawing Sheets

(51) Int. Cl.
  *H04L 29/08* (2006.01)
  *H04W 4/02* (2009.01)
  *G06Q 10/10* (2012.01)
(52) U.S. Cl.
  CPC ........ *H04L 67/24* (2013.01); *H04M 1/72563* (2013.01); *H04M 3/42357* (2013.01); *H04W 4/02* (2013.01)
(58) Field of Classification Search
  CPC .......... H04L 67/18; H04L 67/24; H04W 4/02; G06Q 10/109
  USPC ........................................................ 455/416
  See application file for complete search history.

(56) References Cited

U.S. PATENT DOCUMENTS

| | | | |
|---|---|---|---|
| 8,861,377 B2 | 10/2014 | Okuyama et al. | |
| 2010/0130213 A1* | 5/2010 | Vendrow ........... | H04M 3/42374 455/445 |
| 2010/0241480 A1* | 9/2010 | Rokhlin ........... | G06Q 10/06311 705/7.18 |
| 2011/0081920 A1 | 4/2011 | Hung et al. | |
| 2013/0036184 A1 | 2/2013 | Hung et al. | |
| 2013/0109361 A1 | 5/2013 | Felt | |
| 2014/0152761 A1 | 6/2014 | Homma | |
| 2014/0281728 A1 | 9/2014 | Homma | |
| 2014/0362741 A1 | 12/2014 | Okuyama et al. | |
| 2015/0042749 A1 | 2/2015 | Homma | |
| 2015/0156157 A1* | 6/2015 | Zhang ..................... | H04L 51/22 709/206 |

FOREIGN PATENT DOCUMENTS

| | | |
|---|---|---|
| JP | 2005-244398 | 9/2005 |
| JP | 2008-187390 | 8/2008 |
| JP | 2008187390 A * | 8/2008 |
| JP | 2014-093582 | 5/2014 |
| WO | 2014/069671 A1 | 5/2014 |

* cited by examiner

FIG.5

| COMM. ID | PASSWORD |
|---|---|
| 01aa | aaaa |
| 01ab | abab |
| 01ba | baba |
| ... | ... |

| COMM. ID | TERMINAL NAME | OPE. STATE | RECEPTION DATE/TIME | TERMINAL IP ADDR. | TIME ZONE INFO. | PLACE INFO. | HOLIDAY INFO. | MOVING SPEED |
|---|---|---|---|---|---|---|---|---|
| 01aa | AA | IN MEETING | 1401081340 | 1.2.1.3 | GMT+9 | HQ | WEEKDAY | STOP |
| 01ab | AB | OFFLINE | 1401071200 | 1.2.1.4 | GMT+9 | OTHER | HOLIDAY | LOW SPEED |
| 01ba | BA | IN MEETING | 1401081630 | 1.2.2.3 | GMT-4 | OTHER | HOLIDAY | HIGH SPEED |
| 01ca | CA | ONLINE | 1401081700 | 11.3.1.3 | GMT+5 | HQ | WEEKDAY | LOW SPEED |
| 01cb | CB | ONLINE | 1401082345 | 11.3.1.4 | GMT+5(?) | HQ | WEEKDAY | STOP |
| ... | ... | ... | ... | ... | ... | ... | ... | ... |

| SOURCE TERMINAL COMM. ID | DESTINATION TERMINAL COMM. ID |
|---|---|
| 01aa | 01ab, ···, 01ba, ···, 01ca, 01cb, 01da, 01db, ··· |
| 01ab | 01aa, 01ca, 01cb |
| 01ba | 01aa, 01ab, 01ca, 01cb, 01da, 01db |
| ··· | ··· |
| 01db | 01aa, 01ab, 01ba, ···, 01da, 01ca, 01cb, ···, 01da |

|  | SUITABLE | NORMAL | UNSUITABLE |
|---|---|---|---|
| TRANSMIT AVAIL. ICON | ◎ | ○ | ✕ |

| TIME ZONE | TIME ZONE ICON |
|---|---|
| 00:00~06:00 | Zzz... |
| 06:00~09:00 | (cloud/sun) |
| 09:00~18:00 | (sun) |
| 18:00~21:00 | (moon) |
| 21:00~24:00 | Zzz... |

| PLACE INFO., MOVING SPEED | PLACE ICON |
|---|---|
| HEADQUARTERS | (building) |
| OUTDOOR (OTHER THAN HQ) | (tree, sun) |
| IN MOVING | (car, person) |
| STOP | (desk) |

| HOLIDAY INFO. | HOLIDAY ICON |
|---|---|
| WEEKDAY | weekday |
| HOLIDAY | holiday |

FIG.9

| COMM. ID | HEADQUARTERS (COORDINATES) |
|---|---|
| 01aa | LOCAL OFFICE (JAPAN) |
| 01ab | HEAD OFFICE (JAPAN) |
| 01ba | HOME (JAPAN) |
| 01ca | AMERICAN HEAD OFFICE (U. S.) |
| ... | ... |

FIG.10

|  | TIME ZONE INFO. | PLACE INFO., MOVING SPEED | HOLIDAY INFO. |
|---|---|---|---|
| SUITABLE CONDITION | DURING BUSINESS HOURS | HEADQUARTERS | WEEKDAY |
| UNSUITABLE CONDITION | OVERTIME | OUTDOOR IN MOVING | HOLIDAY |

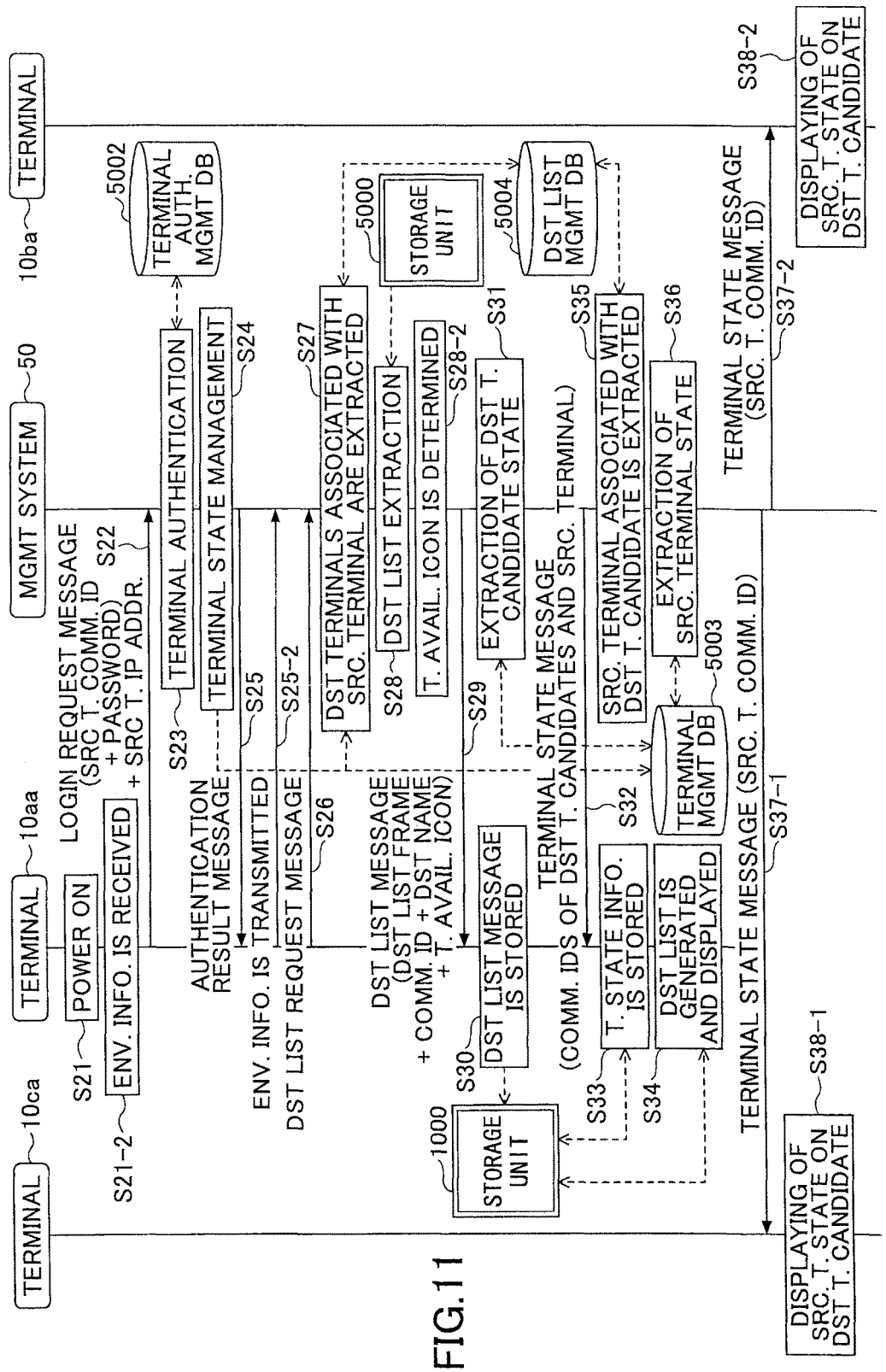

FIG.24

| | TIME ZONE INFO. | PLACE INFO., MOVING SPEED | HOLIDAY INFO. | 5005B |
|---|---|---|---|---|
| SUITABLE CONDITION | 18:00~23:00 | HEADQUARTERS, OUTDOOR | WEEKDAY, HOLIDAY | |
| UNSUITABLE CONDITION | OVERTIME | IN MOVING | — | |

FIG.25

| SITUATION | | LIST OF STATIONS |
|---|---|---|
| ✕ | OFFLINE | 01AB |
| ◐ | IN MEETING | 01BA |
| ◐ | IN WAITING | 01CA |
| ◐ | IN WAITING | 01CB |
| ✕ | OFFLINE | 01DA |

SELECT DST WITH ▲/▼ KEYS AND PRESS ENTER KEY TO START CONNECTION

| SITUATION | LIST OF STATIONS | | | |
|---|---|---|---|---|
| ⌄ IN WAITING | 01CA | 11:00 | | weekday |
| ⌄ IN WAITING | 01CB | 11:00 | 🚶📇 | weekday |
| ⌄ IN MEETING | 01BA | 2:00 | 🚗 | holiday |
| ✗ OFFLINE | 01AB | | | |
| ✗ OFFLINE | 01DA | | | |

SELECT DST WITH ▲/▼ KEYS AND PRESS ENTER KEY TO START CONNECTION

TRANSMISSION SYSTEM, TRANSMISSION TERMINAL, AND TRANSMISSION METHOD

BACKGROUND OF THE INVENTION

1. Field of the Invention

The present invention relates to a transmission system in which a source transmission terminal transmits data to a destination transmission terminal.

2. Description of the Related Art

With development of the information and communication technology and deployment of the communication infrastructure, transmission systems in which image and voice data are transmitted and received between remote places in real time are becoming increasingly popular. Using such a transmission system allows users at two or more remote places to communicate with one another and allows the users to hold a videoconference, for example.

When such a transmission system is used, a user is able to communicate in real time with a partner in one of various countries in the world, but a time difference between the user and the partner may cause difficulties in comprehending a local time of the country or area of the partner. To overcome the problem, a method of transmitting a notification of a local time of a country or area of a destination transmission terminal to a source transmission terminal is known. For example, see Japanese Laid-Open Patent Publication No. 2008-187390.

Japanese Laid-Open Patent Publication No. 2008-187390 discloses a mobile communication network system in which, upon receiving a notification of a calling destination mobile phone from a calling origin mobile phone, a server computes a local time of a stay country of the calling destination mobile phone and transmits the local time to the calling origin mobile phone, so that the calling origin mobile phone displays the local time of the calling destination mobile phone.

However, in the above-described method according to the related art, a user of the calling origin mobile phone is unable to know whether difficulties arise due to a time difference between the calling origin and the calling destination before selecting the calling destination mobile phone.

SUMMARY OF THE INVENTION

In one aspect, the present invention provides a transmission system which enables a user of a source transmission terminal to take into consideration a current situation of a current place of a destination transmission terminal, in advance, and determine the suitability of calling a communication partner of the destination transmission terminal.

In an embodiment which solves or reduces one or more of the above-described problems, the present invention provides a transmission system comprising one or more processors configured to cause a source transmission terminal to transmit data to a destination transmission terminal, the processors including: a receiving unit configured to receive availability information which is generated based on a current place of a destination candidate; a displaying unit configured to display the availability information on a display to allow a user to determine whether transmitting the data to a destination transmission terminal associated with the destination candidate is appropriate; an operation reception unit configured to receive a selection of the destination candidate corresponding to the availability information which is displayed; and a transmission unit configured to transmit the data to the destination transmission terminal associated with the destination candidate the selection of which is received by the operation reception unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 5 is a diagram showing an example of a terminal authentication management database formed of a terminal authentication management table.

FIG. 6 is a diagram showing an example of a terminal management database formed of a terminal management table.

FIG. 7 is a diagram showing an example of a destination list management database formed of a destination list management table.

FIGS. 8A to 8D are diagrams showing an example of an icon image management database formed of a transmit availability icon table and others.

FIG. 9 is a diagram showing an example of a headquarters management database formed of a headquarters management table.

FIG. 10 is a diagram showing an example of an availability determination management database formed of an availability determination table.

FIG. 11 is a sequence diagram for explaining a preparation process for starting communication between transmission terminals.

FIG. 24 is a diagram showing an example of a private availability determination table.

FIG. 25 is a diagram showing an example of a destination list screen which is displayed on a display unit by the transmission terminal as a source terminal.

FIG. 27 is a diagram showing an example of a destination list screen in which destination terminals are sorted according to the local time.

DETAILED DESCRIPTION OF THE PREFERRED EMBODIMENTS

A description will be given of preferred embodiments by making reference to the accompanying drawings.

[Overall Configuration of Embodiment]

Figure 1:
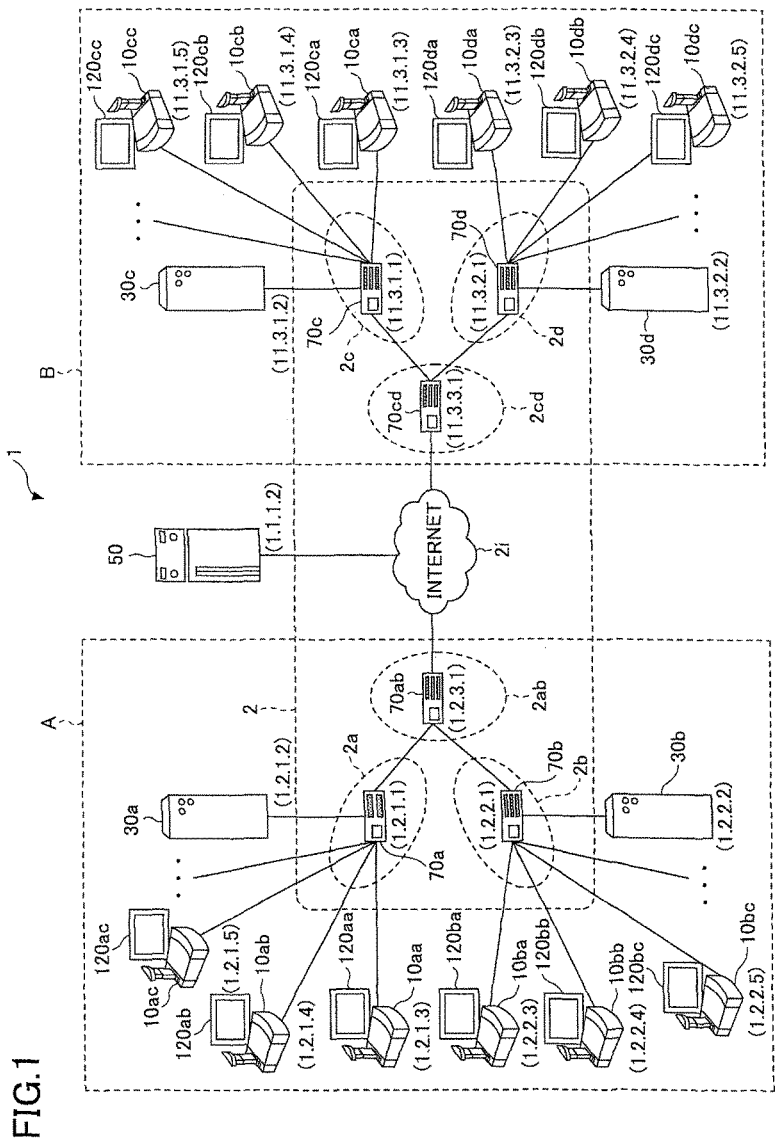
FIG. 1 is a schematic diagram showing a transmission system according to an embodiment.

In the following, an overall configuration of a transmission system 1 according to an embodiment will be described by making reference to FIG. 1. FIG. 1 is a schematic diagram of the transmission system 1 according to the embodiment. There are various types of transmission system. One example may be a data provision system which transmits content data from one transmission terminal to another transmission terminal via a transmission management system in one way. Another example may be a transmission system which transmits information or emotional expressions bidirectionally between two or more transmission terminals via a transmission management system. The transmission system of this type is used to allow the transmission terminals to mutually exchange the information or emotional expressions via the transmission management system. Examples of the transmission system include a videoconference system, a visual telephone system, etc.

The following embodiment conceptualizes a videoconference system as an example of the transmission system, a videoconference management system as an example of the transmission management system and a videoconference terminal as an example of the transmission terminal, and describes the transmission system, the transmission management system and the transmission terminal of the invention. Namely, the transmission terminal and the transmission management system of the invention may be applied not only to the videoconference system but also to other types of transmission system.

As shown in FIG. 1, the transmission system 1 includes two or more transmission terminals (10aa, 10ab, . . . ), two or more displays (120aa, 120ab, . . . ) for the respective transmission terminals (10aa, 10ab, . . . ), two or more relay devices (30a, 30b, 30c, 30d), and a transmission management system 50.

Note that, in the following, any one of the transmission terminals (10aa, 10ab, . . . ) may be called a transmission terminal 10, any one of the displays (120aa, 120ab, . . . ) may be called a display 120, and any one of the relay devices (30a, 30b, 30c, 30d) may be called a relay device 30.

The transmission terminal 10 is configured to transmit and receive image data and voice data as examples of content data. In this embodiment, motion pictures (i.e., video data) are described as an example of the image data. However, the image data may also be still pictures, or the image data may include both motion pictures and still pictures.

Note that, in the following, the transmission terminal may be simply called a "terminal", and the transmission management system may be simply called a "management system." Note that a request source terminal which transmits a request for starting a videoconference will be called a "source terminal", and a request reception terminal (or a relay destination terminal) which receives a videoconference request as a request destination will be called a "destination terminal."

In the transmission system 1, the management data session for transmitting and receiving various items of management data is established between the source terminal and the destination terminal via the management system 50. Moreover, two sessions for transmitting and receiving each of image data and voice data are established between the source terminal and the destination terminal via the relay device 30. Note that the source terminal and the destination terminal may communicate with each other, without using the relay device 30.

The relay device 30 shown in FIG. 1 is configured to relay content data between the terminals 10. The management system 50 is configured to manage the terminals 10 and the relay devices 30 in an integrated manner, including management of login authentication from the terminals 10, management of the communication states of the terminals 10, management of destination lists, management of the communication states of the relay devices 30, etc.

In the transmission system 1 shown in FIG. 1, routers (70a, 70b, 70c, 70d, 70ab, 70cd) are configured to select the optimal path of image data and voice data. Note that, in the following, any one of the routers (70a, 70b, 70c, 70d, 70ab, 70cd) may be simply called a "router 70."

In the transmission system 1 shown in FIG. 1, the terminals (10aa, 10ab, 10ac, . . . ), the relay device 30a, and the router 70a are connected via a LAN 2a so that they may communicate with one another. The terminals (10ba, 10bb, 10bc, . . . ), the relay device 30b, and the router 70b are connected via a LAN 2b so that they may communicate with one another. The LAN 2a and the LAN 2b are set up in a predetermined area A. In the area A, the LAN 2a and the LAN 2b are connected via a dedicated communication line tab including the router 70ab so that they may communicate with one another. For example, the area A may be located in Japan, the LAN 2a may be set up in a Tokyo office, and the LAN 2b is set up in an Osaka office.

On the other hand, in the transmission system 1 shown in FIG. 1, the terminals (10ca, 10cb, 10cc, . . . ), the relay device 30c, and the router 70c are connected via a LAN 2c so that they may communicate with one another. The terminals (10da, 10db, 10dc, . . . ), the relay device 30d, and the router 70d are connected via a LAN 2d so that they may communicate with one another. The LAN 2c and the LAN 2d are set up in a predetermined area B. In the area B, the LAN 2c and the LAN 2d are connected via a dedicated communication line 2cd including the router 70cd so that they may communicate with one another. For example, the area B may be located in the United States of America, the LAN 2c may be set up in a New York office, and the LAN 2d may be set up in a Washington, D.C. office. The area A and the area B are connected by the respective routers 70ab and 70cd via the Internet 2i so that the area A and the area B may communicate with each other via the Internet 2i.

Note that in this embodiment, a communication network 2 is made up of the LAN 2a, the LAN 2b, the dedicated communication line 2ab, the Internet 2i, the dedicated communication line 2cd, the LAN 2c, and the LAN 2d. In the communication network 2, the communications are typically carried out via wires, but may be partially carried out using the wireless communication protocols, such as Wi-Fi (wireless fidelity) or Bluetooth®.

In FIG. 1, the set of four numerals attached beneath or over each of the terminal 10, the relay device 30, the management system 50, and the router 70 simply designates the IP address of the typical IPv4. For example, the IP address of the terminal 10aa is "1.2.1.3", as shown in FIG. 1. The IP address may be the IPv6; however, in this embodiment, the IP address of the IPv4 is used for the sake of simplifying the illustration.

The terminal 10 may be used not only for communication between two or more offices or communication between different rooms in the same office, but may also be used for communication in the same room, communication between the outdoor locations, or communication between the indoor and outdoor locations. When the terminal 10 is used outdoors, the wireless communication may be conducted via a mobile communication network.

Figure 2:
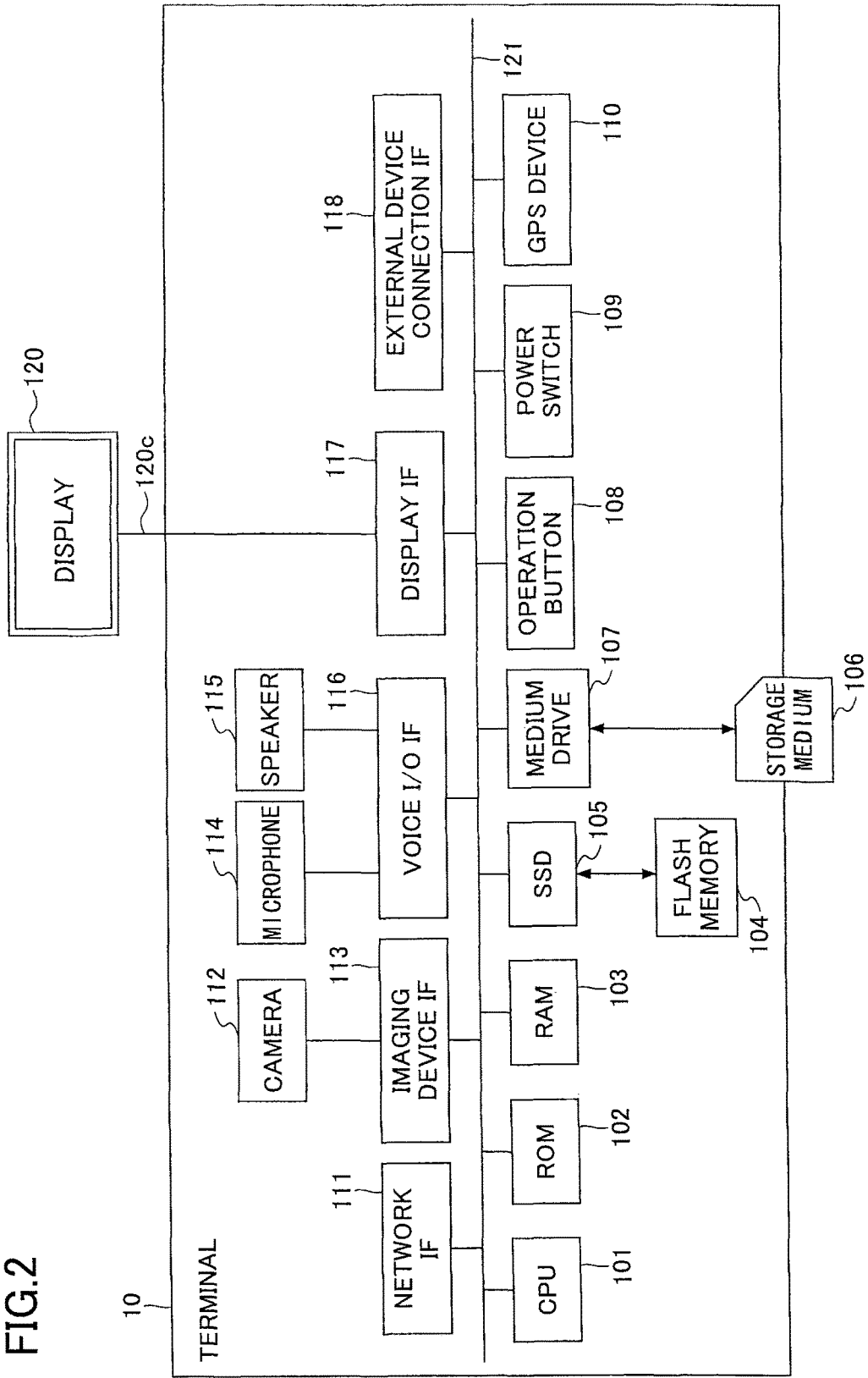
FIG. 2 is a block diagram showing a hardware configuration of a transmission terminal according to the embodiment.

FIG. 2 is a block diagram showing a hardware configuration of the terminal 10 according to the embodiment. As shown in FIG. 2, the terminal 10 includes a central processing unit (CPU) 101 configured to control overall operations of the terminal 10, a read-only memory (ROM) 102 configured to store programs for driving the CPU 101, such as an initial program loader (IPL), a random access memory (RAM) 103 used as a work area of the CPU 101, a flash memory 104 configured to store programs for the terminal 10 and various data, such as image data and voice data, a solid state drive (SSD) 105 configured to control retrieval and writing (storing) of the various data in the flash memory 104 and the like based on the control of the CPU 101, a medium drive 107 configured to control retrieval and writing (storing) of data into a storage medium 106 such as a flash memory, an operation button 108 operated by a user for selecting an address of the destination terminal 10, a power switch 109 for switching ON/OFF of the power of the terminal 10, a network interface (IF) 111 for transmitting data utilizing the communication network 2, and a GPS device 110 configured to detect a position of the terminal 10.

The terminal 10 further includes a built-in camera 112 configured to image a subject based on the control of the CPU 101, an imaging device interface (IF) 113 configured to control driving of the camera 112, a built-in microphone 114 configured to pick up voice sound, a built-in speaker 115 configured to output voice sound, a voice input/output interface (I/O IF) 116 configured to control the input and output of voice signals from the microphone 114 and to the speaker 115 based on the control of the CPU 101, a display interface (IF) 117 configured to transmit image data to an external display 120 based on the control of the CPU 101, an external device connection interface (IF) 118 configured to connect various external devices to the ports of the terminal 10, and a bus line 110 such as an address bus or a data bus for electrically connecting the elements and devices with one another as shown in FIG. 2 via the bus line 110.

The display 120 is a display unit formed of liquid crystal or an organic EL material configured to display images of the subject or icons for operating the terminal 10. Further, the display 120 is connected to the display IF 117 via a cable 120c. The cable 120c may be an analog RGB (VGA) cable, a component video cable, a high-definition multimedia interface (HDMI) cable or a digital video interface (DVI) cable. Note that the display 120 may be replaced by a projector, a rear projection unit, a head-up display (HUD), etc., and the display 120 may be built in the terminal 10.

The camera 112 includes lenses and a solid-state imaging device configured to convert light into electric charges to produce digital images (videos) of the subject. Examples of the solid-state imaging device include a complementary metal oxide semiconductor (CMOS) or a charge coupled device (CCD).

The external device connection IF 118 may be connected via a universal serial bus (USB) cable with external devices, such as an external camera, an external microphone, and an external speaker. When the external camera is connected to the external device connection IF 118 via the USB cable, the external camera is driven in priority to the built-in camera 112 according to control of the CPU 101. Similarly, when the external microphone or the external speaker is connected, the external microphone or the external speaker is driven in priority to the built-in microphone 114 or the built-in speaker 115 according to control of the CPU 101.

The GPS device 110 is configured to detect a position (latitude, longitude, altitude) indicating a location of the terminal 10 by receiving signals from two or more GPS satellites. The GPS device 110 is not limited to the device using the GPS. The GPS device 110 may be another positioning device configured to detect a position of the terminal 10 by using a global positioning system (GNSS) such as "GALILEO", "GLONASS" or "MICHIBIKI". Further, the GPS device 110 may be configured to detect a position of the terminal 10 by using an indoor messaging system (IMES) or the iBeacon®.

Note that the storage medium 106 is removable from the terminal 10. In addition, if the storage medium 106 is a non-volatile memory configured to retrieve or write data based on the control of the CPU 101, the storage medium 106 is not limited to the flash memory 104, and may be an electrically erasable and programmable ROM (EEPROM).

The above-described programs for the terminal may be recorded in an installable format or in an executable format on a computer-readable recording medium such as the storage medium 106 to distribute the medium. The above-described programs for the terminal may be recorded in the ROM 102 rather than the flash memory 104.

Note that the terminal 10 may be manufactured and sold as a dedicated device for the transmission system 1, or the terminal 10 may be implemented by a general-purpose information processing apparatus to operate as the terminal 10 by executing the programs for the terminal. Examples of such an information processing apparatus include a personal computer (PC), a tablet PC, a smart phone, a personal digital assistant (PDA), and a wearable PC.

Figure 3:
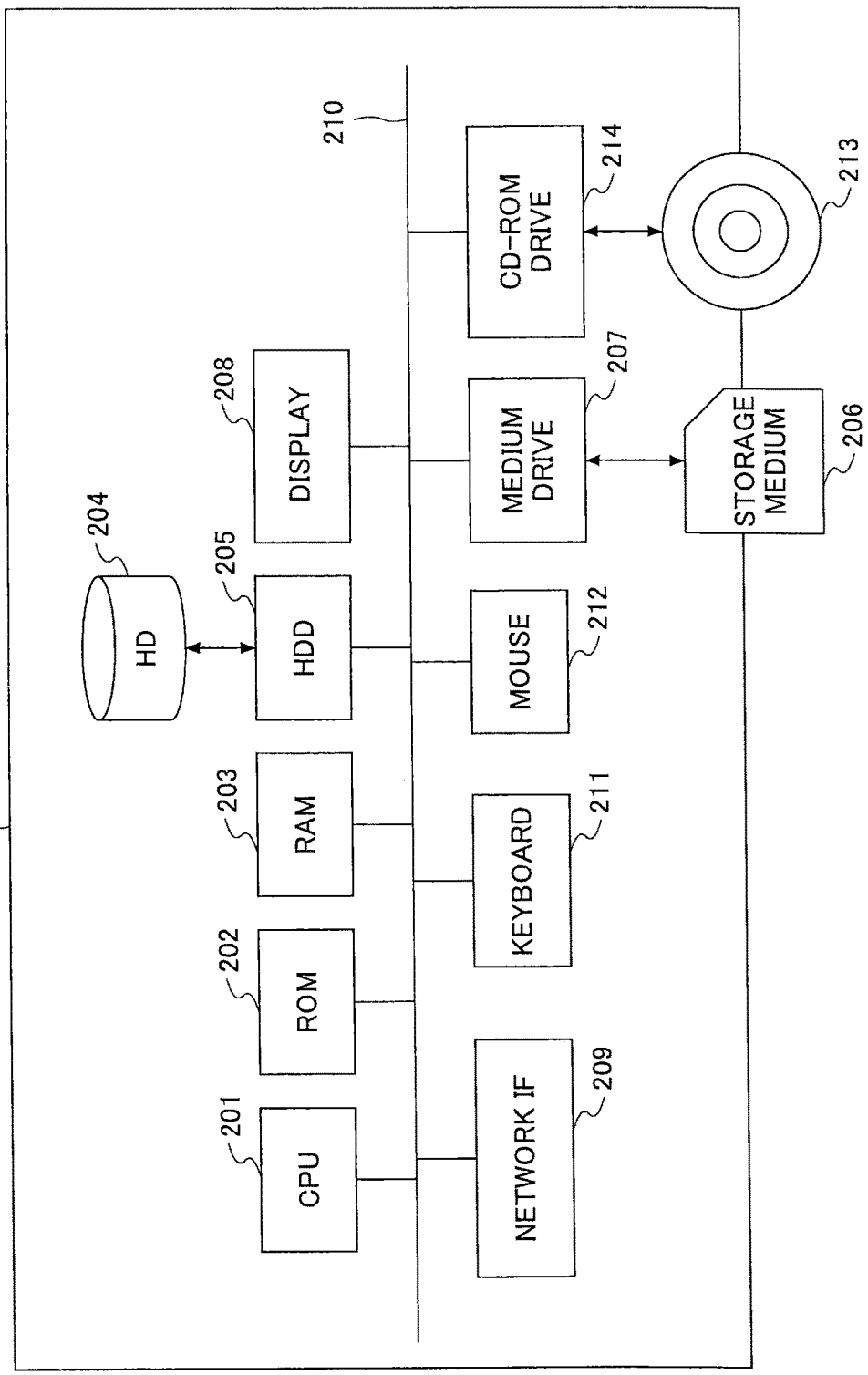
FIG. 3 is a block diagram showing a hardware configuration of a transmission management system according to the embodiment.

FIG. 3 is a block diagram showing a hardware configuration of the management system 50 according to the embodiment. As shown in FIG. 3, the management system 50 includes a central processing unit (CPU) 201 configured to control overall operations of the management system 50, a read-only memory (ROM) 202 configured to store programs for driving the CPU 201 such as an initial program loader (IPL), a random access memory (RAM) 203 utilized as a work area of the CPU 201, a hard disk (HD) 204 configured to store programs for the management system and various data, a hard disk drive (HDD) 205 configured to control retrieval and writing (storing) of the various data in the HD 204 based on the control of the CPU 201, a medium drive 207 configured to control retrieval and writing (storing) of data into a storage medium 206 such as a flash memory, a display 208 configured to display various information such as a cursor, menus, windows, characters and images, a network interface (IF) 209 for transmitting data utilizing the communication network 2, a keyboard 211 including plural keys for inputting the characters, numerals, and various instructions, a mouse 212 for selecting or executing various instructions, selecting items to be processed, and moving the cursor, a CD-ROM drive 214 configured to control retrieval or writing of data in a compact disk read-only memory (CD-ROM) 213 as an example of a removable recording medium, and a bus line 210 such as an address bus or a data bus for electrically connecting the elements and devices with one another shown in FIG. 3 via the bus line 210.

Note that the above-described programs for the management system may be in an installable format or in an executable format on a computer-readable recording medium such as the storage medium 206 or the CD-ROM 213 to distribute the medium. The above-described programs for the management system may be recorded in the ROM 202 rather than the HD 204.

Further, the relay device 30 has a hardware configuration which is the same as the hardware configuration of the management system 50 shown in FIG. 3, and a description of the hardware configuration of the relay device 30 will be omitted. Note that the HD 204 may store programs for controlling the relay device 30. In this case, the programs for the relay device may also be recorded in an installable format or in an executable format on a computer-readable recording medium such as the storage medium 206 or the CD-ROM 213 to distribute the medium. The above-described programs for the relay device may be recorded in the ROM 202 rather than the HD 204.

Note that other examples of the removable recording medium include a compact disc recordable (CD-R), a digital versatile disk (DVD), and a Blu-ray Disc (BD).

[Functional Configuration of Embodiment]

Figure 4:
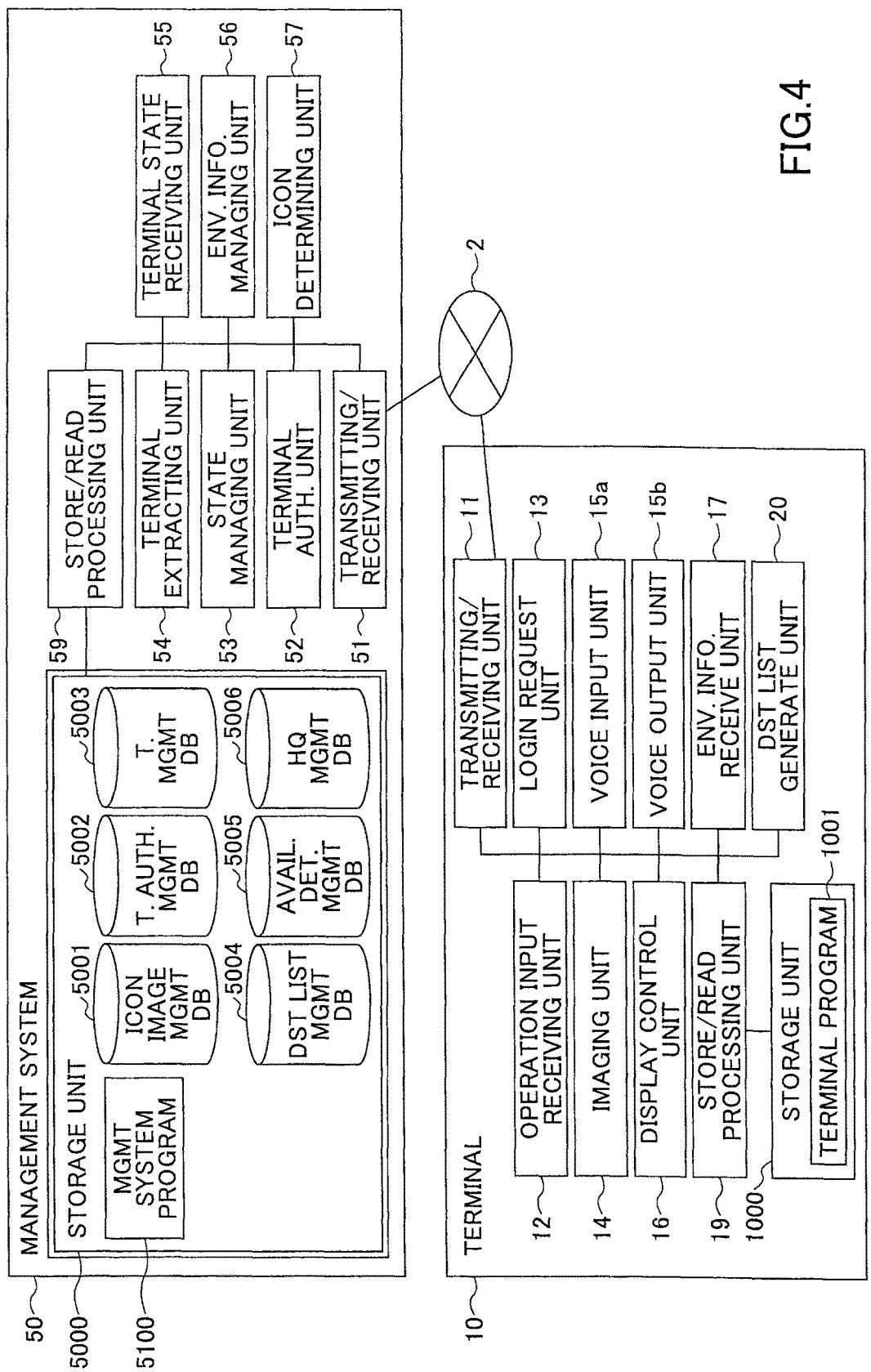
FIG. 4 is a block diagram showing a functional configuration of the transmission terminal and the management system included in the transmission system according to the embodiment.

Next, a functional configuration of the transmission system 1 according to the embodiment will be described by making reference to FIG. 4. FIG. 4 is a block diagram showing the functional configuration of the terminal 10 and the management system 50 included in the transmission system 1 according to the embodiment. In FIG. 4, the terminal 10 and the management system 50 are connected via the communication network 2 so that these devices may communicate with one another. Note that the relay device 30 shown in FIG. 1 is omitted from FIG. 4.

[Functional Configuration of Terminal]

As shown in FIG. 4, the terminal 10 includes a transmitting/receiving unit 11, an operation input receiving unit 12, a login request unit 13, an imaging unit 14, a voice input unit 15a, a voice output unit 15b, a display control unit 16, an environment information receiving unit 17, a destination list generating unit 20, a store/read processing unit 19, and a storage unit 1000. These units of the terminal 10 represent functions and units implemented by any of the elements and devices shown in FIG. 2, which are activated by instructions from the CPU 101 based on a terminal program 1001 read into the RAM 103 from the flash memory 104.

The transmitting/receiving unit 11 is configured to transmit various data (information) to and receive such data from other terminals, relay devices, and systems via the communication network 2. The transmitting/receiving unit 11 starts reception of state information indicating operating states of terminals as destination candidates from the management system 50, before starting communication between the terminal 10 and a destination terminal. Note that the state information may include a detailed operating state (which indicates whether the user is in a session, or indicates whether the user is absent) as well as an operating state (online or offline) of each terminal 10.

Furthermore, in this embodiment, before a user of a source terminal selects a destination terminal, the source terminal displays transmit availability information so that the user of the source terminal may determine whether transmission of data to a destination terminal candidate is appropriate, based on the displayed transmit availability information.

The transmit availability information is information for a user of the source terminal to determine whether calling the destination terminal is appropriate by taking into consideration a current situation of a partner of the destination terminal. The transmit availability information is information for the user of the source terminal to take into consideration the current situation of the partner of the destination terminal in advance and determine the suitability of calling the partner, for example, in the state where the partner carries or holds the terminal and is able to communicate with the user of the source terminal.

Absence information is to report to the calling user that the partner of the destination terminal leaves his seat and cannot call back. The absence information differs from the transmit availability information in that the transmit availability information enables the user of the source terminal to determine the suitability of calling the partner based on the availability of the partner of the destination terminal and the importance of the call from the source terminal.

The operation input receiving unit 12 is configured to receive various inputs from the user, and such a function of the operation input receiving unit 12 is implemented by the operation button 108 and the power switch 109. For example, when the user switches ON the power switch 109, the operation input receiving unit 12 receives a power-ON signal to turn ON the power supply of the terminal 10.

The login request unit 13 is configured to automatically transmit a login request message indicating that the user desires to login, and a current IP address of the terminal 10 as an IP address of a request source terminal from the transmitting/receiving unit 11 to the management system 50 via the communication network 2 when the power-ON signal is received by the operation input receiving unit 12 as a trigger. Such a function of the login request unit 13 is implemented by instructions received from the CPU 101 shown in FIG. 2. On the other hand, when the user switches OFF the power switch 109, the transmitting/receiving unit 11 transmits power-OFF state information to the management system 50, and subsequently the operation input receiving unit 12 turns OFF the power supply completely. Accordingly, the management system 50 may detect that the power of the terminal 10 is changed from the power-ON state to the power-OFF state. Note that the login information and the current IP address of the source terminal may be automatically transmitted to the management system 50 when the user gives an operation input to the terminal 10 as a trigger.

The imaging unit 14 is configured to take an image of a subject and output image data of the subject, and such a function of the imaging unit 14 is implemented by instructions received from the CPU 101, and the camera 112 and the imaging device IF 113 shown in FIG. 2.

The voice input unit 15a is configured to input voice data of the voice signal obtained by the microphone 114 that converts voice of the user into the voice signal, and such a function of the voice input unit 15a is implemented by instructions received from the CPU 101 and the voice input/output IF 116 shown in FIG. 2. The voice output unit 15b is configured to output a voice signal associated with the voice data to the speaker 115 and cause the speaker 115 to output voice and other sound according to the voice signal, and such a function of the voice output unit 15b is implemented by instructions received from the CPU 101 and the voice input/output IF 116 shown in FIG. 2.

The display control unit 16 is configured to control transmission of the image data to the display 120, and such a function of the display control unit 16 is implemented by instructions received from the CPU 101 and the display IF 117 shown in FIG. 2.

Figure 26:
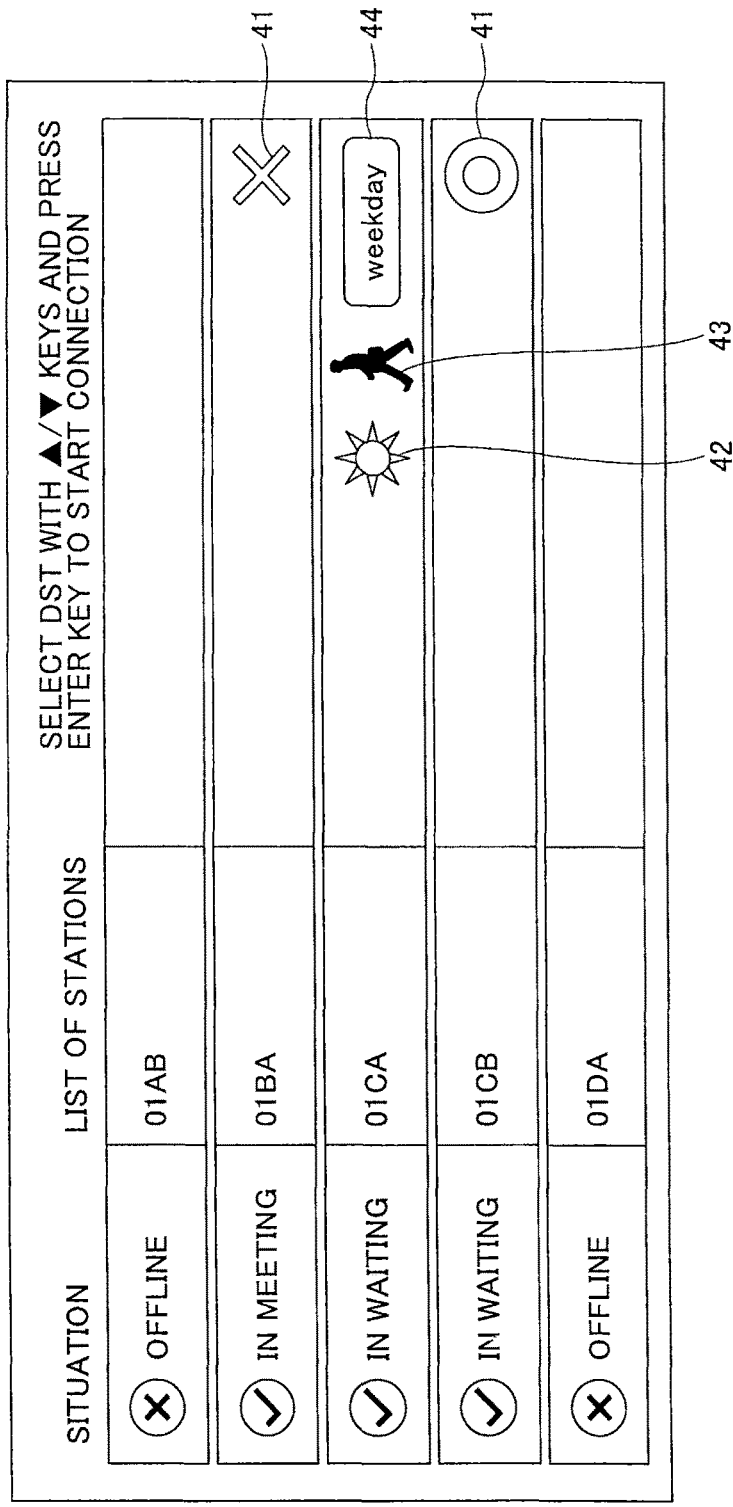
FIG. 26 a diagram showing an example of a destination list screen in which a transmit availability icon is changed to a time zone icon, a place icon, and a holiday icon.

The destination list generating unit 20 is configured to generate and update a destination list which displays the states of destination candidates with icons as shown in FIGS. 25 and 26 based on the later-described destination list information and the state information of the terminal 10 as a destination candidate, which are received from the management system 50. The function of the destination list generating unit 20 is implemented by instructions received from the CPU 101 shown in FIG. 2.

The environment information receiving unit 17 is configured to receive environment information indicating a situation in a current place of the terminal 10. The environment information includes items of a local time of the terminal 10, a current place of the terminal 10, holiday information of a stay country or area of the terminal 10, a moving speed of the terminal 10, etc., which represent the situation in the current place of the terminal 10. The environment information receiving unit 17 is configured to transmit the received environment information to the management system 50 via the transmitting/receiving unit 11. The function of the environment information receiving unit 17 is implemented by instructions received from the CPU 101 shown in FIG. 2.

The store/read processing unit 19 is configured to store various data in the storage unit 1000 or retrieve various data from the storage unit 1000, and such a function of the store/read processing unit 19 is implemented by instructions received from the CPU 101 and the SSD 105 shown in FIG. 2. The storage unit 1000 stores a terminal identification (ID) for identifying the terminal 10, a password, and the like.

The store/read processing unit 19 overwrites the image data and the voice data in the storage unit 1000 with new ones received from the destination terminals every time the terminal 10 transmits data to the destination terminals. Note that the display 120 displays previous image data before being overwritten with the new image data and the speaker 115 outputs previous voice data before being overwritten with the new voice data.

Note that the communication ID according to the embodiment is identification information formed of language, characters and various kinds of symbols that uniquely identify the terminal 10, the terminal program 1001 installed in the terminal 10, or a user of the terminal 10. The communication ID may be the identification information formed of a combination of two or more of the language, characters and various kinds of symbols.

[Functional Configuration of Management System]

The management system 50 includes a transmitting/receiving unit 51, a terminal authentication unit 52, a state managing unit 53, a terminal extracting unit 54, a terminal state managing unit 56, an environment information managing unit 56, an icon determination unit 57, and a store/read processing unit 59. These units of the management system 50 represent functions and units implemented by any of the elements and devices shown in FIG. 3, which are activated by instructions received from the CPU 201 based on the programs for the management system read into the RAM 203 from the HD 204.

The management system 50 further includes a storage unit 5000 which is formed of the HD 204 shown in FIG. 3. Various data or information stored in the storage unit 5000 is maintained even when the power of the management system 50 is turned OFF.

[Terminal Authentication Management Table]

The storage unit 5000 includes a terminal authentication management database 5002 stored therein. FIG. 5 shows an example of the terminal authentication management database 5002 formed of a terminal authentication management table 5002A. In this terminal authentication management table 5002A, passwords are respectively associated with the communication IDs of all the terminals 10 managed by the management system 50. For example, in the terminal authentication management table shown in FIG. 5, the communication ID "01aa" of the terminal 10aa is associated with the password "aaaa."

[Terminal Management Table]

The storage unit 5000 includes a terminal management database 5003 stored therein. FIG. 6 shows an example of the terminal management database 5003 formed of a terminal management table 5003A. In this terminal management table 5003A, the communication IDs of the terminals 10 are respectively associated with terminal names when the terminals 10 are considered destination terminals, operating states of the terminals 10, reception date/times at which the later-described login request message is received by the management system 50, and IP addresses of the terminals 10.

For example, in the terminal management table 5003A shown in FIG. 6, the communication ID "01aa" of the terminal 10aa is associated with the terminal name "AA", the operating state "in meeting", the reception date/time "13:40 on Jan. 8, 2014" at which the login request message was received by the management system 50, and the IP address "1.2.3.4" of the terminal 10aa.

As shown in FIG. 6, the terminal management table 5003A further includes columns of time zone information, place information, holiday information, and moving speed for each of the terminals 10. The time zone information, the place information, the holiday information, and the moving speed are examples of availability factors which are relevant to the current place of each of the terminals 10.

The time zone information indicates a time difference between a current local time of a current place of a stay country or an area where the destination terminal is situated and the standard time GMT. The standard time GMT is the time in Greenwich, London. Because the management system 50 is capable of making reference to this time zone information, the terminal 10 is capable of displaying the time zone information of other terminals 10 when displaying the destination list screen as shown in FIGS. 25 and 26.

A method of receiving the time zone information will be described later. When the reliability of the time zone information is low, a flag may be attached to the time zone information. In FIG. 6, a flag "?" is attached to the time zone information of the communication ID "01cb". Note that the flag may be attached also when the reliability of the time zone information is high, not only when the reliability is low. A number of flags indicating two or more levels of reliability may be attached.

The place information indicates whether the place where the destination terminal is situated is headquarters of the destination terminal or not. The headquarters will be described later. The holiday information indicates whether the current local date in the country or the area where the destination terminal is situated is a holiday or a weekday. The moving speed represents the moving speed of a partner of the destination terminal in the current place by one of a stop, a low speed movement, and a high speed movement.

[Destination List Management Table]

The storage unit 5000 includes a destination list management database 5004 stored therein. FIG. 7 shows an example of the destination list management database 5004 formed of a destination list management table 5004A. In this destination list management table 5004A, communication IDs of the source terminals which are about to request a start of calling in a videoconference are respectively associated with communication IDs of all the destination terminals registered as destination candidates. For example, in the destination list management table 5004A shown in FIG. 7, it is indicated that the destination candidates to which the source terminal (the terminal 10aa) with the communication ID "01aa" is capable of requesting a start of calling in a videoconference include the terminal 10ab with the communication ID "01ab", the terminal 10ba with the communication ID "01ba", etc. The destination candidates may be added to or deleted from the destination list management table 5004A in accordance with the requests of addition or deletion sent from arbitrary source terminals to the management system 50.

[Icon Image Management Table]

The storage unit 5000 includes an icon image management database 5001 stored therein. FIG. 8A shows an example of a transmit availability icon table 5001A which forms a part of an icon image management table stored in the icon image management database 5001. FIG. 8B shows an example of a time zone icon table 5001B which forms a part of the icon image management table stored in the icon image management database 5001. FIG. 8C shows an example of a place icon table 5001C which forms a part of the icon image management table stored in the icon image management database 5001. FIG. 8D shows an example of a holiday icon table which forms a part of the icon image management table stored in the icon image management database 5001.

In the transmit availability icon table 5001A shown in FIG. 8A, transmit availability icons for respectively displaying "suitable", "normal" and "unsuitable" indications as the transmit availability are registered. The transmit availability icons are an example of the availability information.

In the time zone icon table 5001B shown in FIG. 8B, time zone icons for respectively displaying several time zones which are generated by classifying one day (24 hours) are registered. For example, the time zone icon of 9:00-18:00 indicated in FIG. 8B is a time zone icon of business hours.

In the place icon table 5001C shown in FIG. 8C, place or moving speed icons for displaying "headquarters", "outdoor (other than headquarters)", "in moving", and "stop" indications, respectively, are registered in the place information and the moving speed. In the "in moving" indication, the icon of a car indicates a high speed movement, and the icon of a pedestrian indicates a low speed movement.

In the holiday icon table 5001D shown in FIG. 8D, holiday icons for respectively displaying a "weekday" indication and a "holiday" indication are registered.

The transmit availability icons synthetically indicate the transmit availability of a destination terminal. The time zone icons indicate the transmit availability of a destination terminal which is determined in view of the time zone information. The place icons indicate the transmit availability which is determined in view of the place information and the moving speed. The holiday icons indicate the transmit availability of a destination terminal which is determined in view of the holiday information.

Note that data of destination list frames (including image data of destination list frame portions, but not including the icons for displaying the detailed operating states, the communication IDs, and the terminal names) of the destination list screen as shown in FIGS. 25 and 26 are stored in the icon image management table.

[Headquarters Management Table]

The storage unit 5000 includes a headquarters management database 5006 stored therein. FIG. 9 shows an example of the headquarters management database 5006 formed of a headquarters management table 5006A. In this headquarters management table 5006A, the communication IDs of the terminals 10 are associated with the position information (coordinates) of the corresponding headquarters. Note that two or more headquarters may be registered for one terminal 10.

The headquarters may be registered by an administrator of the transmission system 1. To facilitate the registration of coordinates, when performing the initial setting of the terminal 10, the terminal 10 may register the headquarters by transmitting the coordinates measured by using the GPS device 110 to the management system 50. Alternatively, the terminal 10 may register as the headquarters the most frequently measured coordinates among the coordinates measured by the GPS device 110 in the past fixed period.

[Availability Determination Table]

The storage unit 5000 includes an availability determination management database 5005 stored therein. FIG. 10 shows an example of the availability determination management database 5005 formed of an availability determination table 5005A. In the availability determination table 5005A, a suitable condition and an unsuitable condition are registered for each of "time zone information", "place information and moving speed", and "holiday information." The availability determination table 5005A is an example of the evaluation information.

[Functional Configuration of Management System]

Next, the functional configuration of the management system 50 will be described. Note that, in the following, the functions of the management system 50 are explained in association with the main elements and devices for implementing the units of the management system 50 shown in FIG. 3.

The transmitting/receiving unit 51 is configured to transmit various data (information) to and receive such data from other terminals, devices and systems via the communication network 2, and such a function of the transmitting/receiving unit 51 may be implemented by instructions received from the CPU 201 and the network IF 209 shown in FIG. 3.

The terminal authentication unit 52 is configured to search the terminal authentication management table 5002A of the terminal authentication management database 5002 by using as a search key the communication ID and the password included in the login request message received by the transmitting/receiving unit 51, and authenticate the corresponding terminal based on whether the communication ID and the password included in the login request message are identical to those managed in the terminal authentication management table 5002A of the terminal authentication management database 5002. The function of the terminal authentication unit 52 may be implemented by instructions received from the CPU 201 shown in FIG. 3.

The state managing unit 53 is configured to manage the terminal management table 5003A in the terminal management database 5003 by associating the communication ID of the request source terminal, the operating state of the request source terminal, the reception date/time at which the login request message was received by the management system 50, and the IP address of the request source terminal, in order to manage the operating state of the request source terminal which has transmitted the login request message to the management system 50. Moreover, the state managing unit 53 is configured to receive the power-OFF state information (which indicates that the power supply of the terminal 10 is turned OFF)) from the terminal 10 when the user switches OFF the power switch 109 of the terminal 10, and change the operating state of the terminal 10 in the terminal management table 5003A of the terminal management database 5003 from the online state to the offline state based on the received power-OFF state information. The function of the state managing unit 53 may be implemented by instructions received from the CPU 201 shown in FIG. 3.

The terminal extracting unit 54 is configured to search the destination list management table 5004A of the destination list management database 5004 by using as a search key the communication ID of the source terminal having sent the login request message, and extract the communication IDs of the destination terminals which are capable of calling the source terminal, by reading the communication IDs of the destination terminals from the destination list management table 5004A. Moreover, the terminal extracting unit 54 searches the destination list management table 5004A of the destination list management database 5004 by using as a search key the communication ID of the source terminal which has sent the login request message, and extracts from the destination list management table 5004A the communication IDs of other source terminals than the above-described source terminal, including the communication ID of the above-described source terminal registered as one of the destination candidates. The function of the terminal extracting unit 54 may be implemented by instructions received from the CPU 201 shown in FIG. 3.

The terminal state receiving unit 55 is configured to search the terminal management table 5003A of the terminal management database 5003 by using as a search key the communication IDs of the destination candidates extracted by the terminal extracting unit 54, and reads the operating state of the destination candidate for each of the communication IDs extracted by the terminal extracting unit 54. Hence, the terminal state receiving unit 55 may receive the operating states of the destination candidates which are capable of calling the source terminal having sent the login request message. Moreover, the terminal state receiving unit 55 searches the terminal management table 5003A of the terminal management database 5003 by using as a search key the communication ID extracted by the terminal extracting unit 54, and receives the operating state of the source terminal having sent the login request message.

The environment information managing unit 56 is configured to associate the environment information received from the terminal 10 with the communication ID of the terminal 10, and register the received environment information in the terminal management table 5003A.

The icon determination unit 57 is configured to read the registered environment information of each of the terminals 10 from the terminal management table 5003A, and evaluate the suitability of calling the destination terminal for the environment information. Namely, the transmit availability icon, and the time zone icon, the place icon, and the holiday icon associated with the environment information are determined for each of the destination terminals 10.

[Processes and Operation]

Next, processes of transmitting and receiving the management information in a preparation process performed by the transmission system 1 according to the embodiment before starting communications between the terminal 10aa and the destination terminal will be described by making reference to FIG. 11.

FIG. 11 is a sequence diagram for explaining the preparation process for starting communications between the terminals. Note that, in the preparation process shown in FIG. 11, various items of management information are transmitted and received between the terminals in the management data session described above.

In the process of FIG. 11, if a user of the terminal 10aa turns ON the power switch 109, the operation input receiving unit 12 receives a power-ON signal from the power switch 109 and turns ON the power supply of the terminal 10aa (step S21). In a case in which the terminal 10 is a general-purpose information processing apparatus, execution of the terminal program 1001 is started.

Subsequently, the environment information receiving unit 17 receives the environment information of the terminal 10aa (S21-2). Detailed procedures of this step will be described later by making reference to FIGS. 12A through 22B.

In response to the reception of the power-ON signal, the login request unit 13 automatically transmits a login request message indicating the user's login request from the transmitting/receiving unit 11 to the management system 50 via the communication network 2 (step S22). This login request message includes the communication ID for identifying the terminal 10aa as a request source terminal, and the password. The communication ID and the password are the data read from the storage unit 1000 through the store/read processing unit 19 and sent to the transmitting/receiving unit 11. Note that, when the login request message is transmitted from the terminal 10aa to the management system 50, the management system 50 as a reception side station may detect the IP address of the terminal 10aa as a transmission side station.

Subsequently, the terminal authentication unit 52 of the management system 50 searches the terminal authentication management table 5002A of the terminal authentication management database 5002 by using as search keys the communication ID and the password included in the login request message received by the transmitting/receiving unit 51, and authenticates the terminal 10aa based on whether the communication ID and the password included in the login request message are identical to those managed in the terminal authentication management table 5002A (step S23). The communication ID and the password which are identical to those included in the login request message are managed by the terminal authentication unit 52, and when the terminal authentication unit 52 determines that the terminal 10 from which the login request message has been received has the authorized access right, the state managing unit 53 associates the communication ID of the terminal 10aa with the operating state, the IP address of the terminal 10aa, and the reception date/time (at which the login request message was received) for each of the records indicated by the destination names of the terminal 10aa, and stores the same in the terminal management table 5003A (step S24). Accordingly, the communication ID "01aa" associated with the operating state "online", the reception date/time "1401081340", and the IP address "1.2.1.3" of the terminal 10*aa* are managed in the terminal management table 5003A.

Subsequently, the transmitting/receiving unit 51 of the management system 50 transmits an authentication result message, indicating the authentication result obtained from the terminal authentication unit 52, through the communication network 2 to the source terminal (the terminal 10*aa*) from which the login request message has been received (step S25). In the following, the case in which the terminal authentication unit 52 determines that the terminal has the authorized access right will be described.

When the authentication result message indicating that the terminal is determined as having the authorized access right is received, the source terminal (the terminal 10*aa*) transmits the environment information received by the environment information receiving unit 17 to the management system 50 (step S25-2). In the management system 50, the environment information is received by the environment information managing unit 56 so that the received environment information is registered in the terminal management table 5003A of the terminal management database 5003.

Subsequently, the transmitting/receiving unit 11 of the source terminal transmits a destination list request message indicating a request for generating a destination list to the management system 50 via the communication network 2 (step S26). Hence, the transmitting/receiving unit 51 of the management system 50 receives the destination list request message.

Subsequently, the terminal extracting unit 54 searches the destination list management table 5004A of the destination list management database 5004 by using as a search key the communication ID "01aa" of the source terminal (the terminal 10*aa*) from which the login request message has been received, and extracts the communication IDs of the destination candidates capable of calling the source terminal (the terminal 10*aa*) from the destination list management table 5004A (step S27). At the same time, the terminal extracting unit 54 extracts the terminal names associated with the communication IDs from the terminal management table 5003A of the terminal management database 5003 (step S27). In this example, the communication IDs ("01ab", "01ba", . . . ) of the destination terminals (10*ab*, 10*ba*, . . . ) associated with the communication ID "01aa" of the source terminal (the terminal 10*aa*) are extracted, and the terminal names ("AB", "BA", . . . ) associated with the communication IDs of the destination terminals are extracted.

Subsequently, the terminal extracting unit 54 extracts the destination names associated with the communication IDs extracted from the terminal management database 5003 at step S27, and extracts a destination list frame from the icon image management database 5001 (step S28).

Subsequently, the icon determination unit 57 determines the transmit availability icon by making reference to the terminal management table 5003A and the transmit availability icon table 5001A (S28-2). A detailed procedure of this step will be described later with reference to FIG. 23.

Subsequently, the terminal extracting unit 54 transmits a destination list message (destination list frame+communication ID+destination name+transmit availability icon) to the source terminal (the terminal 10*aa*) (step S29). Hence, in the source terminal (the terminal 10*aa*), the destination list information is received by the transmitting/receiving unit 11, and the store/read processing unit 19 stores the received destination list information in the storage unit 1000 (step S30). Note that the time zone icon, the place icon, and the holiday icon as indicated in FIGS. 8B, 8C and 8D, are also transmitted together with the transmit availability icon.

The terminal state receiving unit 55 of the management system 50 searches the terminal management table 5003A of the terminal management database 5003 by using the extracted communication IDs ("01ab", "01ba", . . . ) of the destination candidates as search keys, and receives the operating states of the terminals (10*ab*, 10*ba*, . . . ) as the destination candidates by reading a corresponding operating state for each of the communication IDs (step S31).

Subsequently, the transmitting/receiving unit 51 of the management system 50 transmits a terminal state message including the communication ID "01ab" and the operating state "offline" of the corresponding destination terminal (the terminal 10*ab*) to the source terminal (the terminal 10*aa*) via the communication network 2 (step S32). Moreover, in this step S32, the transmitting/receiving unit 51 transmits individually the remaining terminal state messages, such as a terminal state message including the communication ID "01ba" and the operating state "in meeting" of the corresponding destination terminal (the terminal 10*bc*), to the source terminal (the terminal 10*aa*) via the communication network 2.

Subsequently, the store/read processing unit 19 of the source terminal (the terminal 10*aa*) sequentially stores the terminal state information received from the management system 50 into the storage unit 1000 (step S33). Hence, the source terminal (the terminal 10*aa*) may receive the respective operating states of the destination candidates capable of calling the source terminal (the terminal 10*aa*), such as the terminal 10*ab*, by receiving the terminal state information of each destination terminal.

Subsequently, the destination list generating unit 20 of the source terminal (the terminal 10*aa*) generates a destination list in which the operating states of the destination terminals 10 as the destination candidates are reflected, based on the destination list information stored in the storage unit 1000 and the received terminal state information, and controls the timing of the display control unit 16 to display the destination list on the display 120 (step S34).

On the other hand, the terminal extracting unit 54 of the management system 50 searches the destination list management table 5004A of the destination list management database 5004 based on the communication ID "01aa" of the source terminal (the terminal 10*aa*) from which the login request message has been received, and extracts the communication IDs of other source terminals in the destination list management table 5004A including the communication ID "01aa" of the source terminal (the terminal 10*aa*) registered as a destination candidate (step S35).

Subsequently, the terminal extracting unit 54 of the management system 50 searches the terminal management table 5003A of the terminal management database 5003 based on the communication ID "01aa" of the source terminal (the terminal 10*aa*) from which the login request message has been received, and extracts the operating state of the source terminal (the terminal 10*aa*) (step S36).

Subsequently, the transmitting/receiving unit 51 of the management system 50 transmits the terminal state message including the communication ID "01aa" of the source terminal (the terminal 10*aa*) and the operating state "online" thereof, received at the step S36, to the terminals, included in the terminals (10*ab*, 10*ba*, . . . ) of the communication IDs ("01ab", "01ba", . . . ) extracted at the step S35, whose operating states are registered as "online" in the terminal management table 5003A (steps S37-1, S37-2). Note that, before the transmitting/receiving unit 51 transmits the terminal state information to the terminals (10ba, 10ca), the IP addresses of the corresponding terminals are read from the terminal management table 5003A shown in FIG. 6 based on the communication IDs ("01ba", "01ca"). Hence, the communication ID "01aa" of the source terminal (the terminal 10aa) from which the login request message has been received and the operating state "online" thereof may be displayed on each of other destination terminals (10ba, 10ca, . . . ) capable of calling the source terminal (steps S38-1, S38-2).

If a user of another terminal 10 in the transmission system 1 according to the embodiment turns ON the power switch 109, the operation input receiving unit 12 receives a power-ON signal from the power switch 109, the process of FIG. 11 including the above steps S21-2 through S38-2 is also performed by the transmission system 1 in a similar manner, and a description thereof will be omitted.

Subsequently, the user of the source terminal presses the operation button 108 and selects a destination terminal from the destination list screen shown in FIGS. 25 and 26. The management system 50 selects the relay device 30 by taking into consideration the frequency band, etc., and sends a notification of the selected relay device 30 to each of the source terminal and the destination terminal. Hence, a content data session between the terminals is established to allow transmission of image data and voice data between the source terminal and the destination terminal.

[Reception of Environment Information]

Next, processes for receiving the environment information, including the time zone information, the place information, the holiday information, and the moving speed by the terminal 10 will be described.

[Method of Receiving Time Zone Information]

In the following, six different processes for receiving the time zone information by the terminal 10 at the step S21-2 in the process of FIG. 11 will be described separately with reference to FIGS. 12A through 16B.

1. Set-Up Time Zone Information

A user or an administrator of the terminal 10 sets up time zone information from a setting screen of the terminal 10 and transmits the time zone information to the management system 50. Hence, the time zone information may be used without the need for detecting a position of the terminal 10 using the GPS device 110 or the like or for receiving the time zone information from a mobile communication network which will be described later.

Figure 12A:
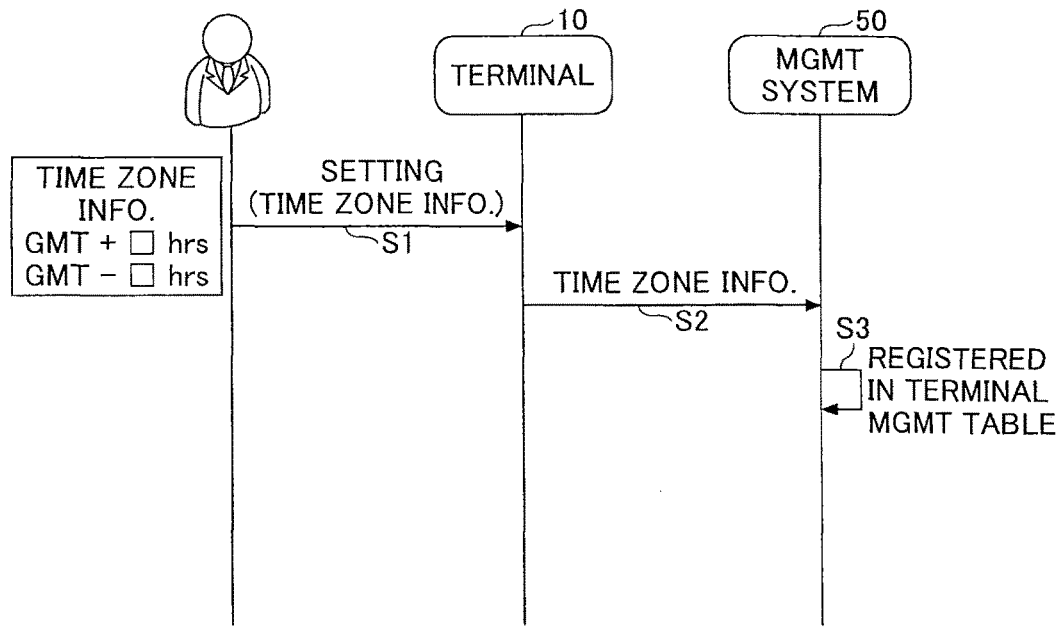
FIGS. 12A and 12B are sequence diagrams for explaining a process in which the transmission terminal transmits time zone information to the management system.

FIG. 12A is a sequence diagram for explaining a process in which the terminal 10 transmits the time zone information to the management system 50.

S1: A user or an administrator operates the terminal 10 to input a time difference between a local time of the terminal 10 and the standard time GMT.

S2: If the user or the administrator presses the operation button 108, the transmitting/receiving unit 11 of the terminal 10 transmits its communication ID and the time zone information to the management system 50.

S3: After the time zone information is received by the transmitting/receiving unit 51 of the management system 50, the environment information managing unit 56 registers the time zone information in the terminal management table.

The terminal 10 may cause the storage unit 1000 to store the time zone information set up by the user or the administrator of the terminal 10. In this case, even if the user or the administrator does not set up the time zone information, the time zone information stored in the storage unit 1000 may be transmitted to the management system 50.

2. Time Zone Information Supplied from Mobile Communication Network

When the terminal 10 uses a mobile communication network for mobile phones as a communication line, time information and the time zone information may be supplied to the terminal 10 from a base station of the mobile communication network. Hence, exact time zone information may be received.

Figure 12B:
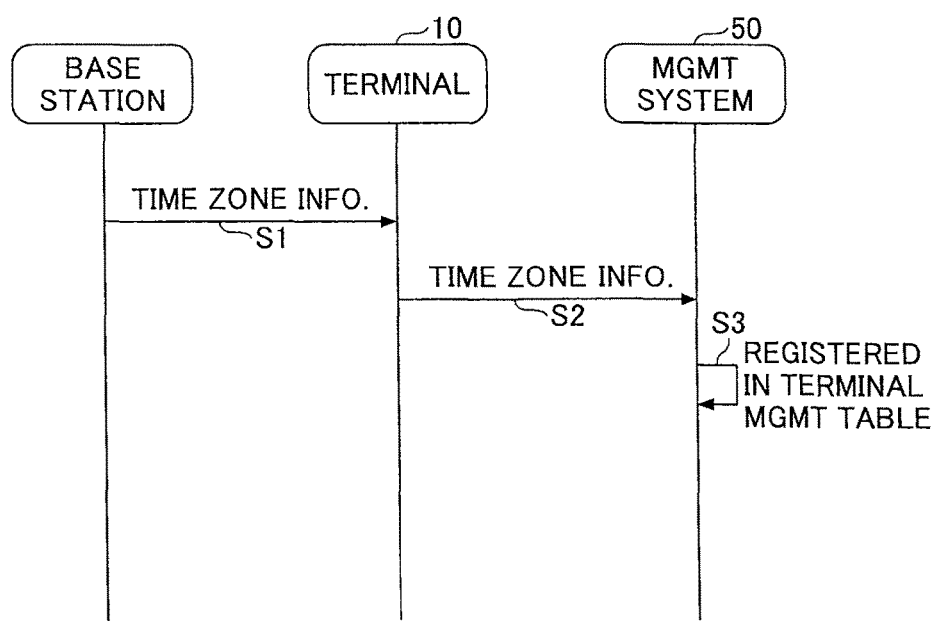

FIG. 12B is a sequence diagram for explaining a process in which the terminal receives the time zone information from the base station of the mobile communication network.

S1: The environment information receiving unit 17 of the terminal 10 receives the time zone information from the base station of the mobile communication network.

S2: The transmitting/receiving unit 11 of the terminal 10 transmits the time zone information received from the mobile communication network to the management system 50.

S3: After the time zone information is received by the transmitting/receiving unit 51 of the management system 50, the environment information managing unit 56 registers the time zone information in the terminal management table.

3. Derivation of Time Zone Information from Positioning Information

The terminal 10 extracts the time zone information from position information received from a positioning system, such as GPS. Hence, the time zone information may be derived from exact position information.

Figure 13A:
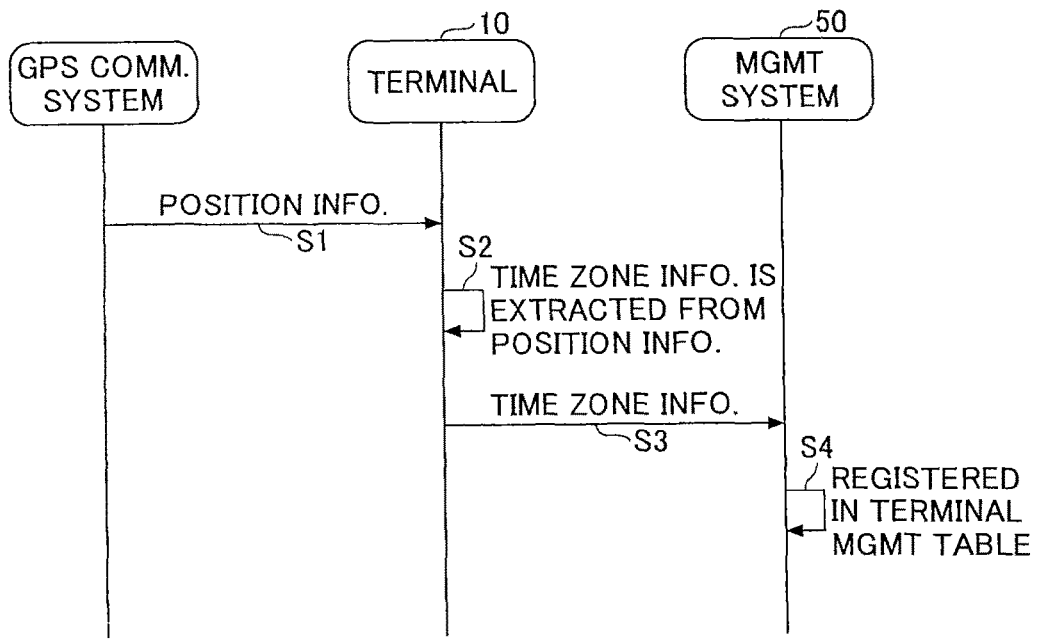
FIGS. 13A and 13B are sequence diagrams for explaining a process in which the transmission terminal extracts time zone information from position information.

FIG. 13A is a sequence diagram for explaining a process in which the terminal 10 extracts the time zone information from the position information.

S1: The GPS device 110 of the terminal 10 receives the position information from the positioning system, such as GPS.

S2: The environment information receiving unit 17 extracts the time zone information using a database in which a position is associated with the time zone information. This database may be stored in either the terminal 10 or a server (not illustrated).

S3: The terminal 10 transmits the received time zone information to the management system 50.

S4: After the time zone information is received by the transmitting/receiving unit 51 of the management system 50, the environment information managing unit 56 registers the time zone information in the terminal management table.

Figure 13B:
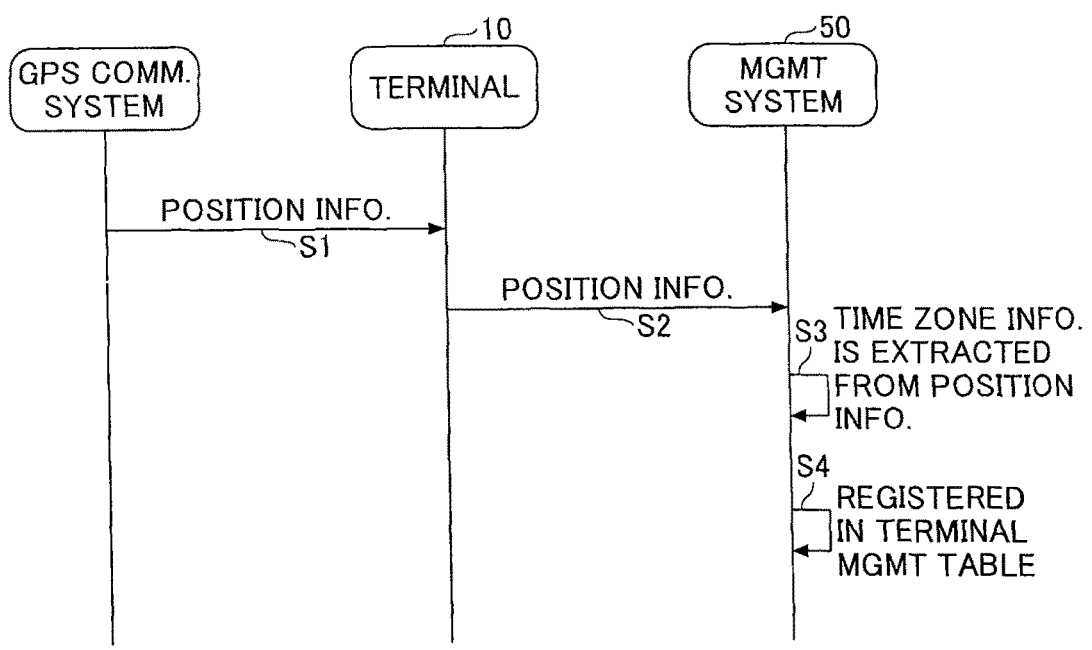

Alternatively, the management system 50 may perform a process which generates time zone information from the position information. FIG. 13B is a sequence diagram for explaining a process in which the terminal 10 transmits the position information to the management system 50.

S1: The GPS device 110 of the terminal 10 receives the position information from a positioning system, such as GPS.

S2: The transmitting/receiving unit 11 of the terminal 10 transmits the position information to the management system 50.

S3: After the position information is received by the transmitting/receiving unit 51 of the management system 50, the environment information managing unit 56 generates time zone information using a database in which a position is associated with the time zone information. This database may be stored in either the management system 50 or a server (not illustrated).

S4: The environment information managing unit 56 registers the time zone information in the terminal management table.

4. Use of Stored Time Zone Information

When the terminal 10 cannot receive the time zone information from the setting or the communication line, the management system 50 uses the previously used time zone information which was stored in the terminal 10 or the management system 50. Hence, even when the terminal 10 cannot receive the current time zone information, the stored time zone information may be used.

Figure 14A:
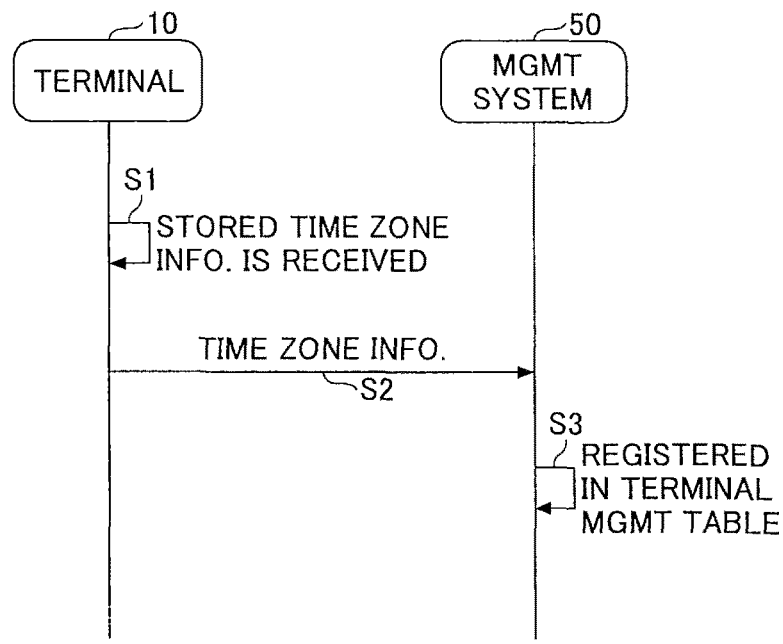
FIGS. 14A and 14B are sequence diagrams for explaining a process in which the transmission terminal transmits the stored time zone information to the management system.

FIG. 14A is a sequence diagram for explaining a process in which the terminal 10 transmits the stored time zone information to the management system 50. This process is performed when the time zone information cannot be received from a base station, when a position of the terminal 10 cannot be detected from a positioning system, such as GPS, or when the time zone information cannot be obtained from the detected position information.

S1: When it is determined that the time zone information cannot be received, the terminal 10 reads the stored time zone information from the storage unit 1000. Typically, this time zone information is the previously received time zone information. Alternatively, the user may select one of a plurality of stored time zone information items.

S2: The transmitting/receiving unit 11 of the terminal 10 transmits the time zone information to the management system 50.

S3: The environment information managing unit 56 of the management system 50 registers the time zone information in the terminal management table.

Figure 14B:
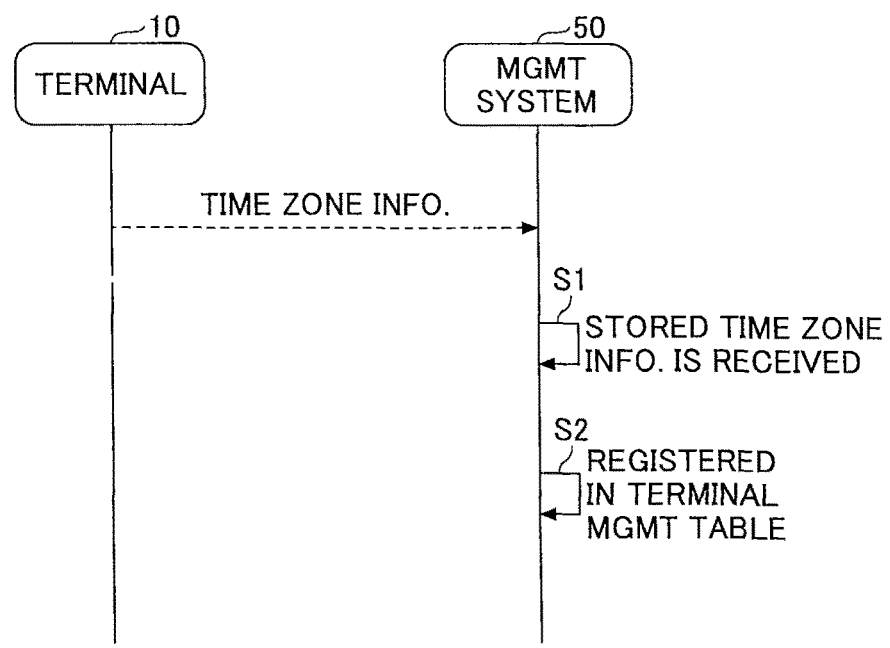

FIG. 14B is a sequence diagram for explaining a process in which the management system 50 registers the time zone information stored in the storage unit 5000 into the terminal management database 5003.

S1: When neither position information nor time zone information may be received from the terminal 10, the environment information managing unit 56 of the management system 50 reads the stored time zone information from the storage unit 5000. Note that when a notification that time zone information cannot be received is received from the terminal 10, the management system 50 may use the previously used time zone information. The time zone information registered in the terminal management database 5003 may be used instead of that stored in the storage unit 5000.

S2: The environment information managing unit 56 of the management system 50 registers the time zone information in the terminal management table.

5. Use of Communication Line Information

In general, it is possible to receive position information of a communication device from an IP address of the device or a MAC address of an access point connected to the device by using a Web service, a database, etc. An IP address is assigned to the terminal 10 and the terminal 10 has a unique MAC address. Position information of the terminal 10 may be received by using these addresses. Hence, even when the GPS device 110 is not provided in the terminal 10, the terminal 10 may receive the time zone information from the position information.

Figure 15A:
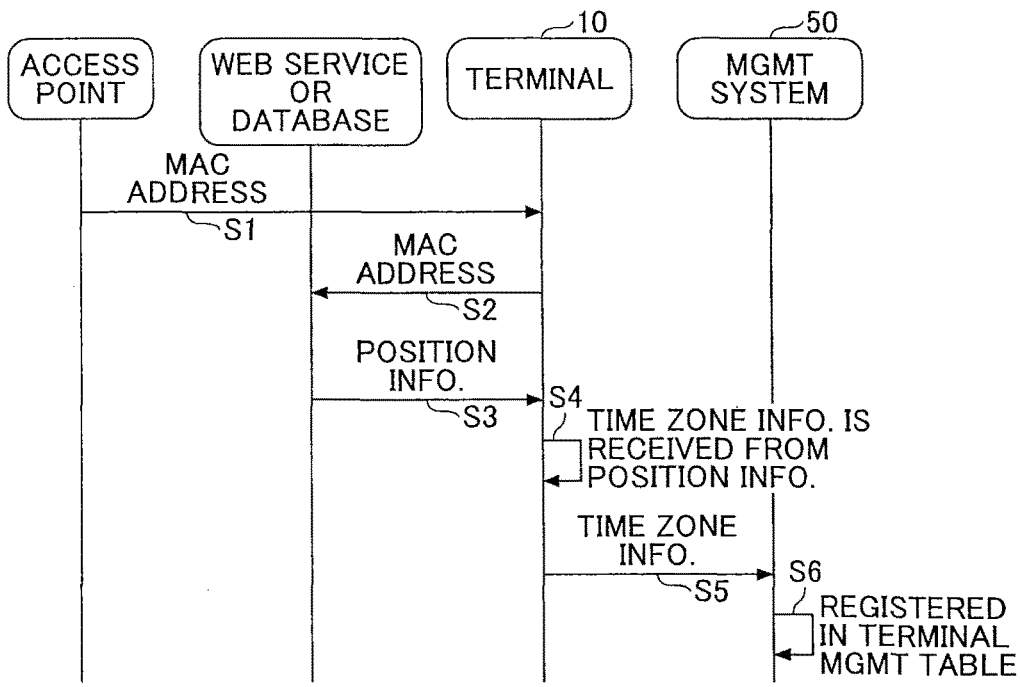
FIGS. 15A and 15B are sequence diagrams for explaining a process in which the transmission terminal receives time zone information from a MAC address.

FIG. 15A is a sequence diagram for explaining a process in which the terminal 10 receives the time zone information from a MAC address.

S1: When the transmitting/receiving unit 11 of the terminal 10 is connected to the communication network 2 via an access point, the access point also has a unique MAC address. Hence, the terminal 10 is capable of receiving a MAC address of the access point.

S2: Although there is no clear relationship between a MAC address and a position, the terminal 10 is capable of receiving position information of the access point by making reference to a database in which position information associated with a MAC address is registered. Moreover, if radio field intensities from two or more access points are known, the terminal 10 is capable of receiving the position information of the terminal 10 by transmitting a position information request with the radio field intensities and the MAC addresses of the access points to the database. Note that accessing the database may be performed by either the terminal 10 or the management system 50.

S3: Once the position information is received, the terminal 10 is capable of receiving the time zone information from the position information.

S4: The terminal 10 transmits the time zone information to the management system 50.

S5: The management system 50 registers the time zone information in the terminal management table.

Note that, instead of the MAC address of the access point, the position information or the time zone information may be received from the access point at the step S1.

Figure 15B:
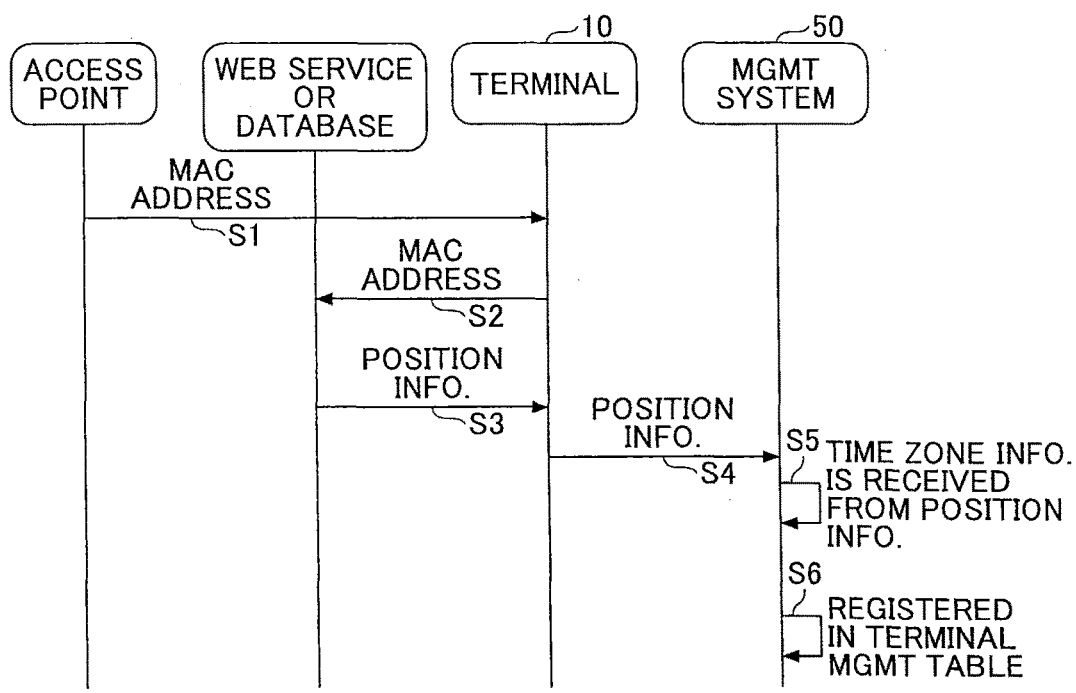

FIG. 15B is a sequence diagram for explaining a process in which the management system 50 receives the time zone information from the position information. In the process of FIG. 15B, steps S1 and S2 are essentially the same as corresponding steps in the process of FIG. 15A, and a description thereof will be omitted.

S3: The terminal 10 transmits the position information to the management system 50.

S4: The management system 50 receives the time zone information from the position information.

S5: The management system 50 registers the time zone information in the terminal management table.

Figure 16A:
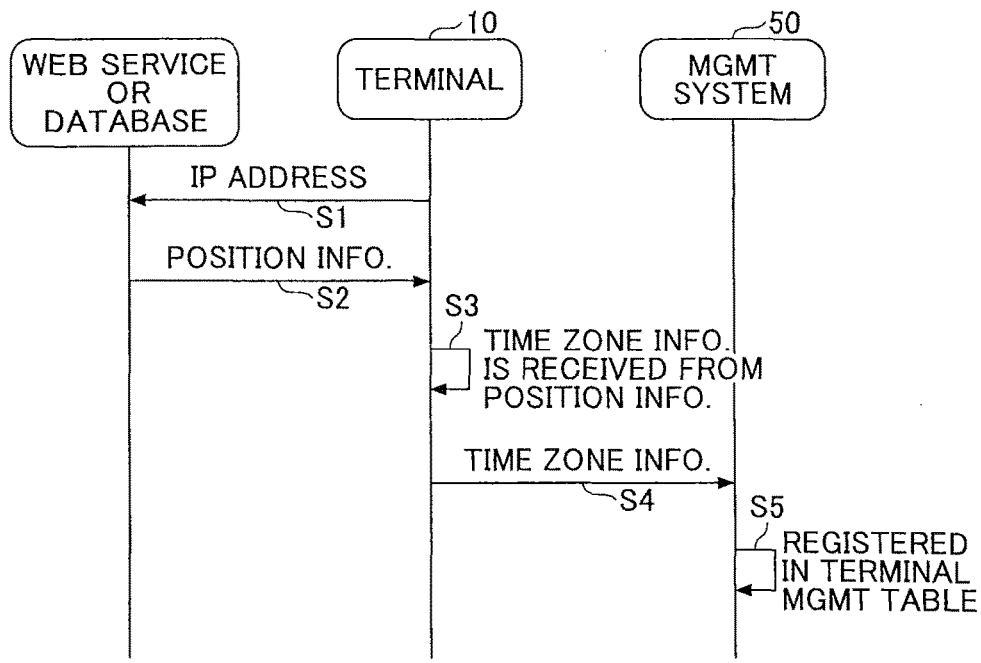
FIGS. 16A and 16B are sequence diagrams for explaining a process in which the transmission terminal receives time zone information from an IP address.

FIG. 16A is a sequence diagram for explaining a process in which the terminal 10 receives time zone information from an IP address.

S1: Ranges of IP addresses assigned to countries or areas are respectively defined in advance. A country or an area of the terminal 10 may be determined by the terminal 10 by making reference to a database storing the information which associates the IP address of the terminal with the country or the area. Note that accessing the database may be performed by either the terminal 10 or the management system 50.

In the process of FIG. 16A, steps S2 to S5 are essentially the same as corresponding steps in the process of FIG. 15A, and a description thereof will be omitted.

Figure 16B:
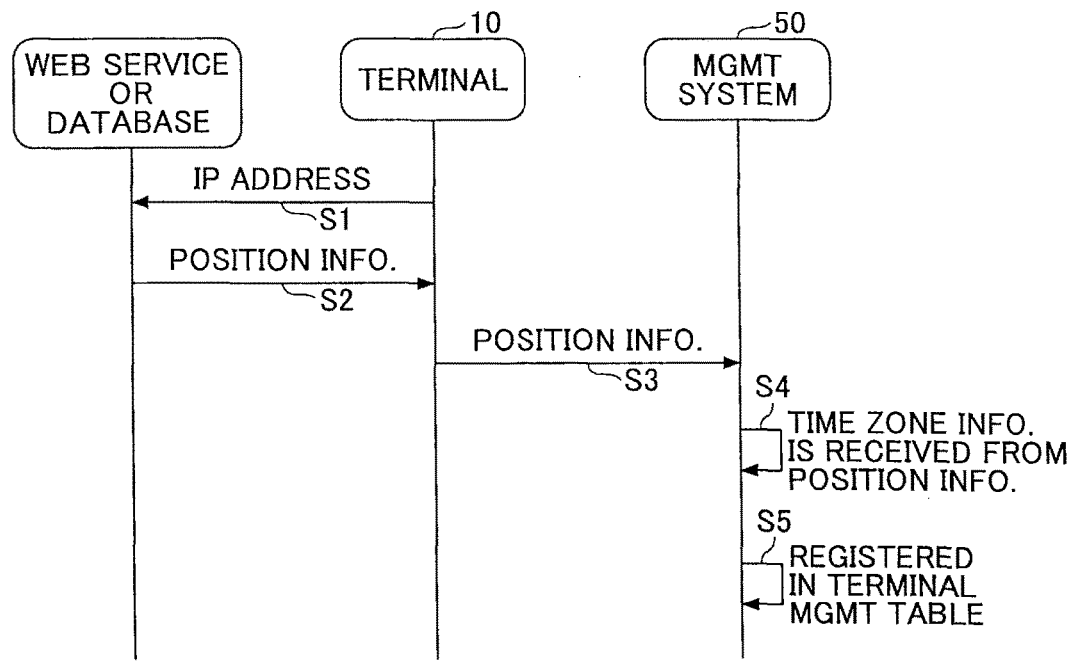

FIG. 16B is a sequence diagram for explaining a process in which the management system 50 receives the time zone information from the position information.

In the process of FIG. 16B, steps S1 and S2 in which the terminal 10 receives the position information from the IP address are essentially the same as corresponding steps in the process of FIG. 16A, steps S3 to S5 in the process of FIG. 16B in which the management system 50 receives the time zone information from the position information are essentially the same as corresponding steps in the process of FIG. 15B, and a description thereof will be omitted.

6. Use of Data Center

The management system 50 may be arranged to include several data centers which are situated in several countries or areas respectively. These data centers operate as the management system 50 in their own countries or areas respectively.

Figure 17:
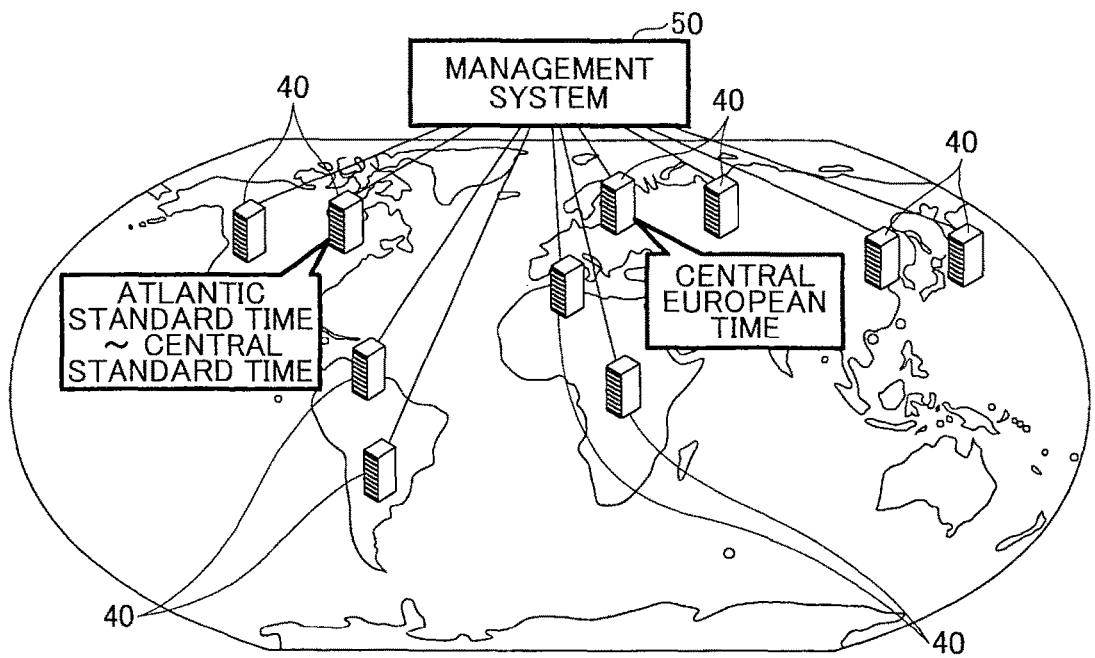
FIG. 17 is a diagram showing an example of data centers which are situated in several countries or areas.

FIG. 17 is a diagram showing an example of data centers 40 which are situated in several countries or areas. For example, the management system 50 may be arranged to include data centers 40 which are situated in North America, South America, Africa, Eastern Europe, Western Europe, China, Japan, etc., respectively, in order to accept the connections from the terminals 10 in a country or area where many users live.

The terminal 10 performs communications using the data center 40 nearest to the terminal 10. The data center 40 stores its own position, and the management system 50 may determine the time zone information of the terminal 10 based on the position of the data center 40 used by the terminal 10. In a case in which the management system 50 uses the data center 40, the management system 50 may determine the position and the time zone information of the terminal 10 even when the terminal 10 cannot receive the position information.

Figure 18:
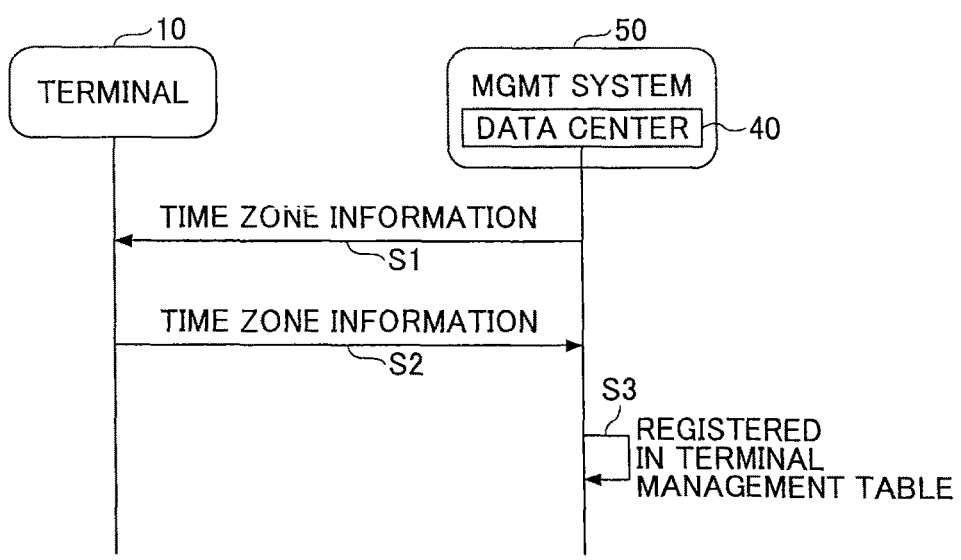
FIG. 18 is a sequence diagram for explaining a process in which the transmission terminal receives position information from a data center.

FIG. 18 is a sequence diagram for explaining a process in which the terminal 10 receives the position information from a data center 40. Note that the data center 40 may be considered identical to the management system 50, and, in FIG. 18, the data center 40 is illustrated as being included in the management system 50.

S1: The terminal 10 sends a time zone information request to the data center 40 and receives the time zone information from the data center 40. The time zone information of the terminal 10 may not be received directly. Alternatively, the terminal 10 may receive the position information of the data center 40 instead. The terminal 10 may determine a position of the data center 40 to which the terminal 10 is connected based on the received position information, and may determine the position and the time zone information of the terminal 10 to some accuracy. For example, in a case in which the data centers 40 are situated in North American eastern and western areas, respectively, the terminal 10 may roughly determine the position of the terminal 10 as the area of Atlantic Standard Time (GMT−4) to Central Standard Time (GMT−6) when accessing the data center 40 of the North American eastern area. Moreover, when accessing the data center 40 in a Central European area, the terminal 10 may roughly determine the position of the terminal 10 as being the area of Central European Time (GMT+1).

S2: The terminal 10 transmits the received time zone information to the management system 50.

S3: The management system 50 registers the time zone information in the terminal management table.

Note that since the accuracy of the time zone information may be low when the time zone information is received in this way using the data center 40, a flag may be attached to the time zone information in the terminal management table (e.g. (?) attached to the time zone information for the communication ID "01cb" in FIG. 6). Hence, the source terminal may detect that the accuracy of the time zone information of the destination terminal is low.

In the foregoing, the processes 1 to 6 for receiving the time zone information have been described. The management system 50 is configured to sequentially perform some of the processes 1 to 6 in descending order of priority and utilize the time zone information if it is received. The user or the administrator sets up priority levels of some of the processes for receiving the time zone information which are performed by the terminal 10 or the management system 50.

Figure 19:
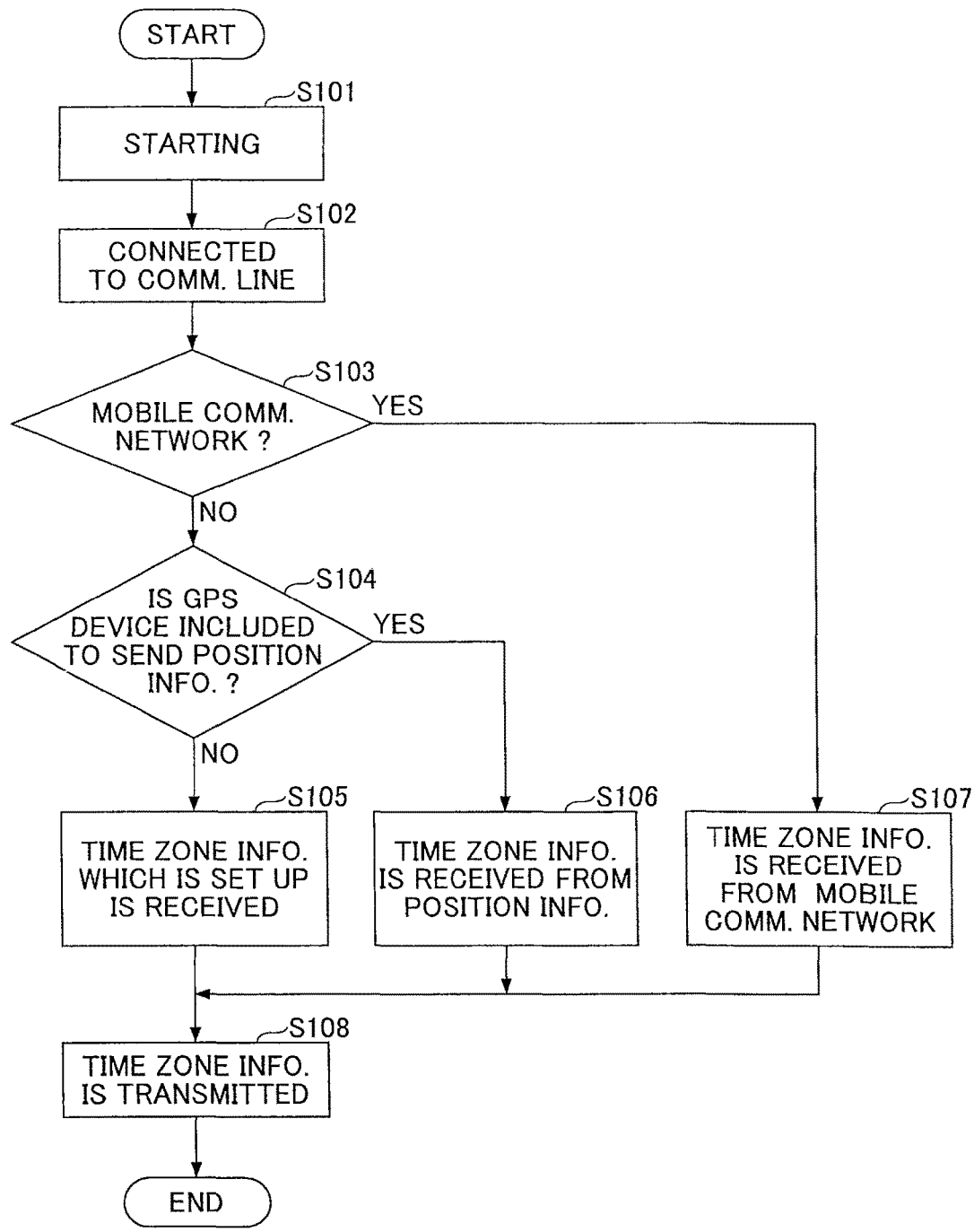
FIG. 19 is a flowchart for explaining a process in which the transmission terminal receives time zone information using some time zone information receiving processes in descending order of priority.

FIG. 19 is a flowchart for explaining a process in which the terminal 10 receives the time zone information using some of the above receiving processes in descending order of priority. The process shown in FIG. 19 is a detailed process for receiving the time zone information in the environment information which is performed at step S21-2 in the process shown in FIG. 11. Here, it is assumed that the terminal 10 is configured to receive the time zone information using the processes 1 to 3 in descending order of priority, i.e. in order of the process 2, the process 3, and the process 1.

First, as previously described at step S21 of FIG. 11, operation of the terminal 10 is started upon reception of a power-ON signal (S101).

When the terminal 10 is operating, the transmitting/receiving unit 11 communicates with the management system 50 in order to receive authentication from the management system 50. Hence, the terminal 10 is connected to the communication line, such as a base station or an access point (S102).

The environment information receiving unit 17 determines whether the communication line is a mobile communication network (S103). When the communication devices used in the terminal 10 for communication in a mobile communication network and for communication in a wireless LAN differ, the OS determines which of the communication devices is to be used. The environment information receiving unit 17 may determine whether the communication line is the mobile communication network by receiving a response from the OS.

When the communication line is a mobile communication network (YES in step S103), the environment information receiving unit 17 receives the time zone information from the mobile communication network (S107).

When the communication line is not a mobile communication network (NO in step S103), the environment information receiving unit 17 determines whether the terminal 10 has the GPS device 110 and is capable of receiving the current position of the terminal 10 (S104). For example, the environment information receiving unit 17 determines whether the terminal 10 is capable of receiving the current position of the terminal 10 by sending a position request to and receiving a response from the GPS device 110.

When the position information may be received with the GPS device 110 (YES in step S104), the environment information receiving unit 17 receives the time zone information from the position information (S106).

When the position information cannot be received with the GPS device 110 (NO in step S104), the environment information receiving unit 17 receives the time zone information which is set up by the user or the administrator (S105).

After one of the steps S105 to 107 is performed, the transmitting/receiving unit 11 transmits the time zone information received by the environment information receiving unit 17 (S108).

In this manner, the time zone information is registered in the terminal management table, and the terminal extracting unit 54 may determine a transmit availability icon by analyzing the place information, the holiday information, and the moving speed comprehensively.

Moreover, using the time zone information, the source terminal may display the time zone icon, and the user of the source terminal may determine whether the destination terminal is to be called by taking into consideration the time zone information of the country or the area where the destination terminal is situated.

[Reception of Place Information]

In this embodiment, the management system 50 registers, in the terminal management table, data indicating whether the current place of the destination terminal 10 is the headquarters or not, in order to determine whether the place of the destination terminal is appropriate for communication.

Each user will register as a headquarters a place where the terminal 10 is frequently used, such as a user's local office or a user's house. Namely, when the terminal 10 as a destination terminal is in the headquarters, the user of the source terminal may start communication with the destination terminal without supposing that the availability of the partner of the destination terminal is low. On the other hand, when the terminal 10 as a destination terminal is not in the headquarters (e.g., during a business trip, during a movement, absence from work, etc.), the user of the source terminal may suppose that the availability of the partner of the destination terminal is low, and may determine whether the destination terminal is to be called, by taking into consideration the importance of the requirements.

The environment information managing unit 56 of the management system 50 determines whether the place information corresponds to the headquarters based on the position information and the headquarters information. Specifically, when a difference between the position registered as the headquarters and the current position is less than a threshold, the environment information managing unit 56 determines that the place information corresponds to the headquarters.

Figure 20:
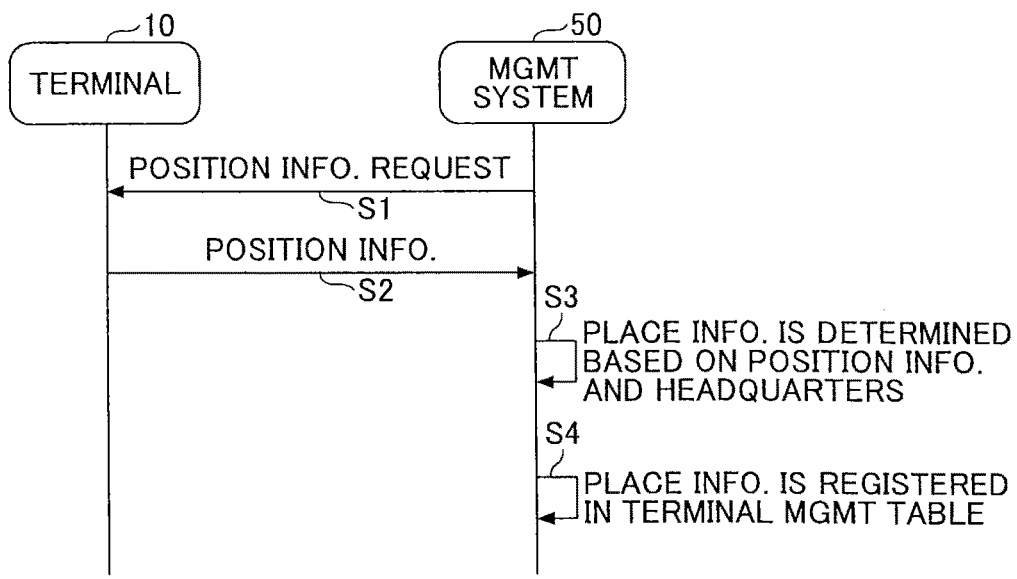
FIG. 20 is a sequence diagram for explaining a process for registering place information in the management system.

FIG. 20 is a sequence diagram for explaining a process in which the management system 50 registers the place information. The process of FIG. 20 is performed at intervals of a predetermined period of time while the terminal 10 is operating (online). When operation of the terminal 10 is not started, the process of FIG. 20 is performed upon starting of the terminal 10. When it is detected that the terminal 10 is moved beyond a predetermined distance, the terminal 10 may transmit the position information.

S1: The environment information managing unit 56 of the management system 50 sends a position information request to the terminal 10.

S2: The environment information receiving unit 17 of the terminal 10 transmits the position information to the management system 50. This position information may be any of the position information measured by the GPS device 110, the position information received based on an IP address, the position information received based on a MAC address, and the position information from the data center 40.

S3: The environment information managing unit 56 of the management system 50 determines whether the current place of the terminal 10 corresponds to the headquarters by comparing the position information with the headquarters of the headquarters management table.

S4: The environment information managing unit 56 registers the place information in the terminal management table.

In this manner, the place information is registered in the terminal management table, and the icon determination unit 57 may determine a transmit availability icon by analyzing the time zone information, the holiday information, and the moving speed comprehensively.

Moreover, using the place information, the source terminal may display the place icon, and the user of the source terminal may determine whether the destination terminal is to be called by taking into consideration the current place of the partner of the destination terminal.

[Reception of Holiday Information]

In this embodiment, the management system 50 registers, in the terminal management table, data indicating whether the current date is a holiday or a weekday, in order to determine whether the current date that the user of the source terminal intends to call a destination terminal is a holiday in a calendar of a country or an area where the destination terminal is situated. For example, the holiday may include a day (or a public holiday) when the public organization is in principle set to rest from execution of jobs and business, Sunday, Saturday, etc. The holiday is registered in a calendar for each of countries or areas.

When the current date of the terminal 10 as the destination terminal is a weekday in the country or area, the user of the source terminal may start communication without supposing that the availability of the partner of the destination terminal is low. On the other hand, when the current date of the terminal 10 as the destination terminal is a holiday in the country or area, the user of the source terminal may suppose that the availability of the partner of the destination terminal is low, and may determine whether the destination terminal is to be called, by taking into consideration the importance of the requirements.

The environment information managing unit 56 of the management system 50 determines a country or an area from the position information of the terminal 10 to select a calendar of the country or area, and determines whether the current date is a holiday based on the calendar. The environment information managing unit 56 registers the holiday information indicating whether the current date is a holiday or a weekday in the terminal management table.

Figure 21:
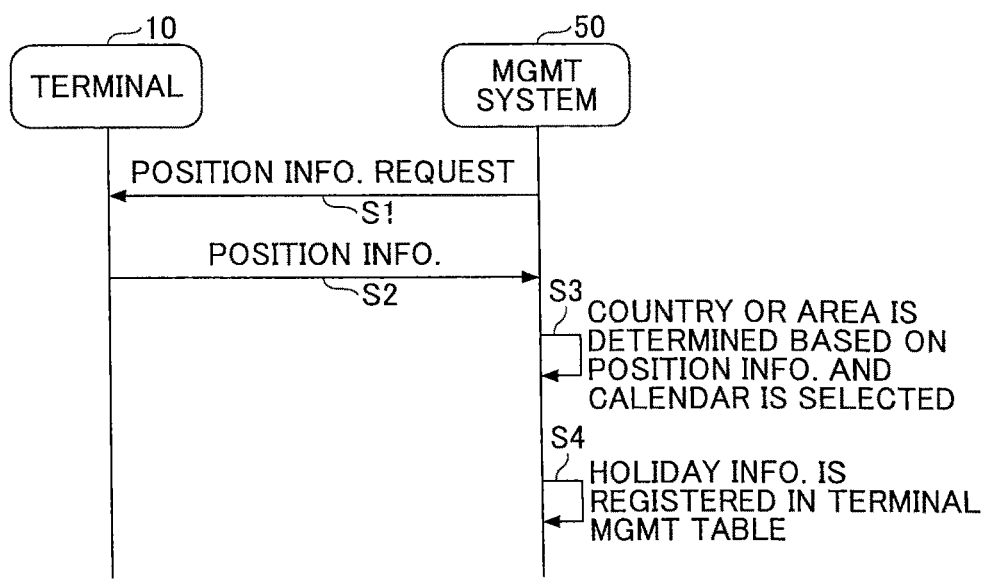
FIG. 21 is a sequence diagram for explaining a process for registering holiday information in the management system.

FIG. 21 is a sequence diagram for explaining a process in which the management system 50 registers the holiday information. The process of FIG. 21 is performed at intervals of a predetermined period of time while the terminal 10 is operating (online). When operation of the terminal 10 is not started, the process of FIG. 21 is performed upon starting of the terminal 10.

S1: The environment information managing unit 56 of the management system 50 sends a position information request to the terminal 10.

S2: The environment information receiving unit 17 of the terminal 10 transmits the position information to the management system 50. This position information may be any of the position information measured by the GPS device 110, the position information received based on an IP address, the position information received based on a MAC address, and the position information received from the data center 40.

S3: The environment information managing unit 56 of the management system 50 determines a country or an area based on the position information, and selects a calendar of the country or area.

S4: the environment information managing unit 56 determines whether the current date is a holiday or a weekday by making reference to the calendar, and registers the holiday information in the terminal management table.

In this manner, the holiday information is registered in the terminal management table, and the icon determination unit 57 may determine a transmit availability icon by analyzing the time zone information, the place information, and the moving speed comprehensively.

Moreover, using the holiday information, the source terminal may display a holiday icon and the user of the source terminal may determine whether the destination terminal is to be called, by taking into consideration the holiday information of the country or area where the destination terminal is situated.

[Reception of Moving Speed]

In this embodiment, a moving speed of the destination terminal is registered in the terminal management table in order to determine whether the partner of the destination terminal is in a movement.

When a partner of the terminal 10 as a destination terminal is not moving, the user of the source terminal may start communication without supposing that the availability of the partner of the destination terminal is low. On the other hand, when a partner of the terminal 10 as a destination terminal is moving, the user of the source terminal may suppose that the availability of the partner of the destination terminal is low, and may refrain from calling the destination terminal in principle.

The cases in which the destination terminal is in a moving state include a case in which the partner is walking, a case in which the partner is moving by train, a case in which the partner is moving by car, etc. In any of these cases, it is not suitable for the partner of the destination terminal to communicate with the user of the source terminal. However, in a case in which the partner of the destination terminal is walking at a low speed, the partner may stop and talk on the terminal. In such a case, it may be suitable for the partner of the destination terminal to communicate with the user of the source terminal depending on the importance of the requirements by the user.

In order to determine a moving speed of a destination terminal, a method of determining, by the terminal 10, the moving speed using an acceleration sensor or based on the position information on time series, or a method of computing, by the management system 50, the moving speed based on the time-series position information received from the terminal 10 may be used.

Figure 22A:
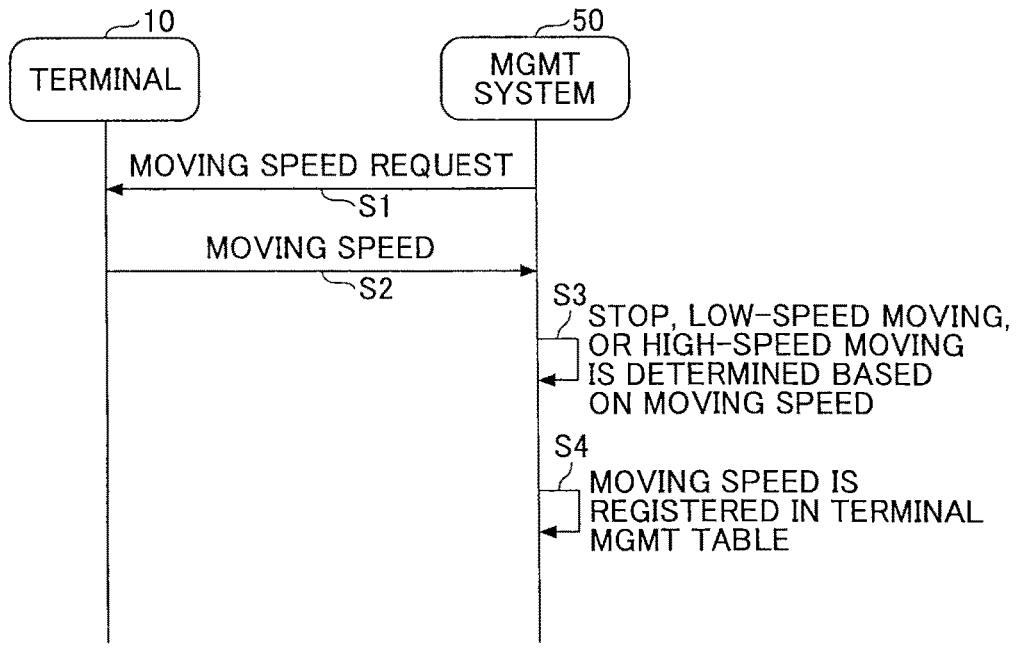
FIGS. 22A and 22B are sequence diagrams for explaining a process for registering moving speed information in the management system.

FIG. 22A is a sequence diagram for explaining a process in which the management system 50 registers the moving speed. The process of FIG. 22A is performed at intervals of a predetermined period of time while the terminal 10 is operating (online). When operation of the terminal 10 is not started, the process of FIG. 22A is performed upon starting of the terminal 10.

S1: The environment information managing unit 56 of the management system 50 sends a moving speed request to the terminal 10.

S2: The environment information receiving unit 17 of the terminal 10 transmits a moving speed to the management system 50.

S3: The environment information managing unit 56 of the management system 50 determines one of a stop, a low speed movement, and a high speed movement based on the moving speed. The stop may represent a case in which the moving speed may be zero or be regarded to be zero. The low speed movement may represent a case in which the moving speed is equivalent to a walking speed (0 km/h<moving speed≤6 km/h). The high speed movement may represent a case in which the moving speed is higher than the walking speed (6 km/h<moving speed).

S4: The environment information managing unit 56 registers the moving speed in the terminal management table.

Figure 22B:
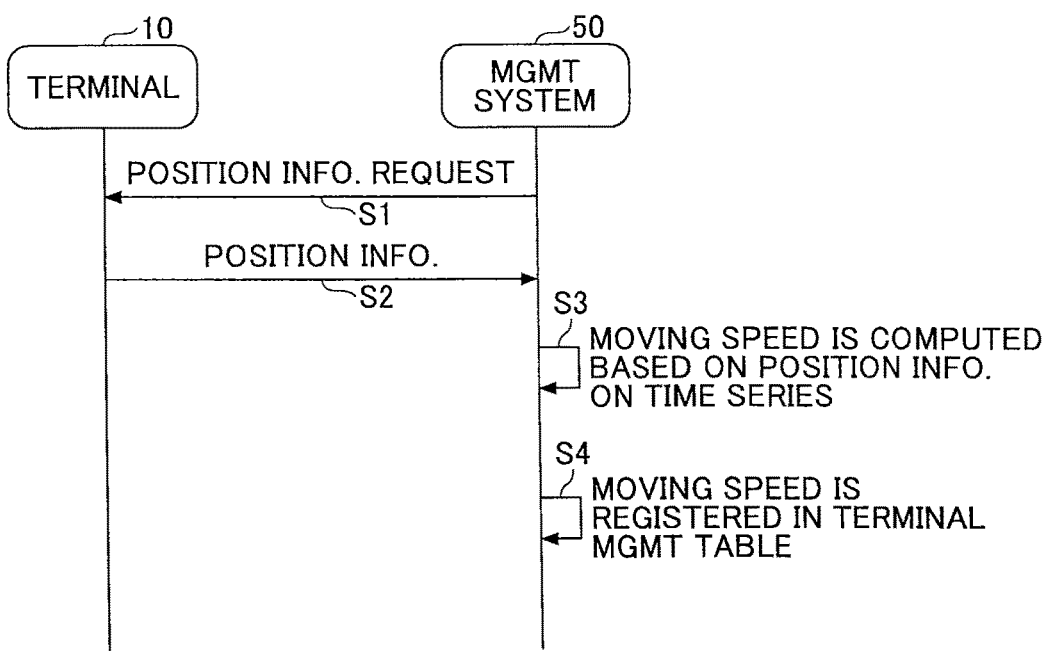

FIG. 22B is a sequence diagram for explaining a process in which the management system 50 registers the moving speed. The process of FIG. 22B is performed at intervals of a predetermined period of time while the terminal 10 is operating (online). When operation of the terminal 10 is not started, the process of FIG. 22B is performed upon starting of the terminal 10.

S1: The environment information managing unit 56 of the management system 50 sends a position information request to the terminal 10.

S2: The environment information receiving unit 17 of the terminal 10 transmits the position information to the management system 50.

S3: The environment information managing unit 56 of the management system 50 computes a moving speed based on the time-series position information.

S4: The environment information managing unit 56 registers the moving speed in the terminal management table.

In this manner, the moving speed is registered in the terminal management table, and the icon determination unit 57 may determine a transmit availability icon by analyzing the time zone information, the place information, and the holiday information comprehensively.

Moreover, using the place information and the moving speed information, the source terminal may display a place icon, and the user of the source terminal may determine whether the destination terminal is to be called, by taking into consideration the moving speed of the partner of the destination terminal.

[Environment Information when Terminal is in Offline State]

When the destination terminal is set in an offline state, the management system 50 has the last registered environment information stored in the terminal management table. Hence, even when the destination terminal is in an offline state, the source terminal may display the transmit availability information (for example, a transmit availability icon) in the destination list. However, it is likely that the environment information of an offline-state terminal is unreliable, and it is not desirable for the source terminal to display the transmit availability information in such a case. Hence, the transmission system 1 according to this embodiment is configured to refrain from displaying the transmit availability information of an offline-state destination terminal. Exceptionally, if a user requests the management system 50 to display the transmit availability information of an offline-state destination terminal, the transmit availability information may be displayed.

[Icon Displaying of Environment Information]

As described above, the time zone information, the place information, the holiday information, and the moving speed information of destination candidates are registered in the terminal management table. The icon determination unit 57 of the management system 50 evaluates the suitability of calling each of the destination candidates by making reference to the terminal management table and the availability determination table, and determines a transmit availability icon based on the evaluation result.

Figure 23:
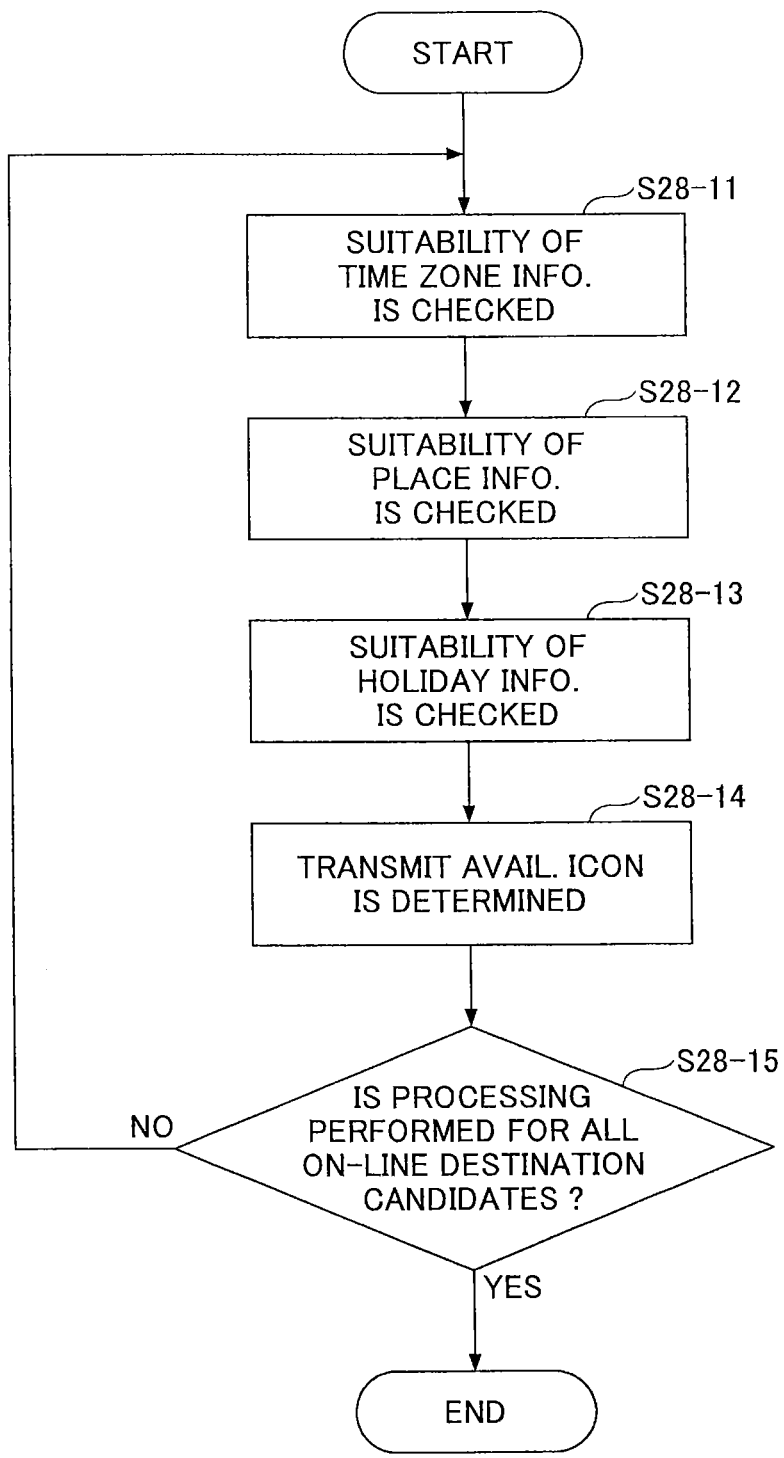
FIG. 23 is a flowchart for explaining a process in which an icon determination unit of the management system determines a transmit availability icon.

FIG. 23 is a flowchart for explaining a process in which the icon determination unit 57 of the management system 50 determines a transmit availability icon. The process of FIG. 23 is performed at step S28-2 in the process of FIG. 11. Subsequently, the process of FIG. 23 is performed again when at least one of the time zone information, the place information, the holiday information, and the moving speed of the terminal management table is updated.

Upon starting of the process of FIG. 23, the icon determination unit 57 of the management system 50 checks the suitability of the time zone information by making reference to the availability determination table 5005A (S28-11). Namely, the current local time of the current place of the destination candidate is computed based on the time zone information, and it is checked whether the current local time is in business hours. For example, the business hours may be set to fixed values, such as 9:00 to 17:00. The business hours of the partner of the destination terminal may be registered beforehand.

Moreover, the icon determination unit 57 reads a time zone icon associated with the current time zone by making reference to the time zone icon table 5001B.

Subsequently, the icon determination unit 57 checks the suitability of the place information and the moving speed by making reference to the availability determination table 5005A (S28-12). Namely, it is checked whether the current place is the headquarters and whether the destination terminal is during movement. Moreover, the icon determination unit 57 reads a place icon associated with the place information and the moving speed by making reference to the place icon table 5001C.

Subsequently, the icon determination unit 57 checks the suitability of the holiday information by making reference to the availability determination table 5005A (S28-13). Namely, it is checked whether the current date in the country or area of each of the destination candidates is a holiday. Moreover, the icon determination unit 57 reads a holiday icon associated with the holiday information by making reference to the holiday icon table 5001D.

Subsequently, the icon determination unit 57 determines the transmit availability icon of each of the destination candidates (S28-14). There are several methods of determining the transmit availability icon. For example, in this embodiment, the transmit availability icon is determined as follows.

(i) If it is determined that all the time zone information, the place information and moving speed, and the holiday information are consistent with suitable conditions, then the transmit availability icon is determined as being a "suitable" indication.

(ii) If it is determined that one or two of the time zone information, the place information and moving speed, and the holiday information are consistent with the suitable conditions, then the transmit availability icon is determined as being a "normal" indication.

(iii) If it is determined that all the time zone information, the place information and moving speed, and the holiday information are consistent with unsuitable conditions, then the transmit availability icon is determined as being an "unsuitable" indication.

The icon determination unit 57 determines the transmit availability icon as being one of the "suitable" indication, the "normal" indication, and the "unsuitable" indication, by making reference to the transmit availability icon table 5001A.

The icon determination unit 57 repeats the processing of steps S28-11 to S28-14 until the transmit availability icon is determined for all the on-line destination candidates (S28-15).

Note that, in the determination of the transmit availability icon, weighting factors may be assigned to the time zone information, the place information and moving speed, and the holiday information. For example, the weighting factors may be assigned as follows.

Suitable Conditions:
Time-zone Information: 3 points
Place Information and Moving Speed: 2 points
Holiday Information: 3 points
Unsuitable Conditions:
Time-zone Information: −2 points
Place Information and Moving Speed: −2 points
Holiday Information: −3 points The transmit availability icon may be determined by computing the sum of the weighting factors respectively applied to the icons in the transmit availability icon table 5001A (in the case of the example of FIG. 8A, three icons). Moreover, the source terminal may display the transmit availability information with the sum of the weighting factors, and may display a list of the destination terminals sorted in order of the sum of the weighting factors when displaying the transmit availability information.

[Change of Availability Determination Table]

It is conceivable that the suitable conditions and the unsuitable conditions may differ for every user of the terminal 10. Moreover, it is conceivable that, for the same user of the terminal 10, there is a case in which the suitable conditions and the unsuitable conditions may differ according to the time zone. Hence, different availability determination tables may be registered for the terminals 10 respectively. If a desired one of the availability determination tables is selected beforehand, the source terminal may display a transmit availability icon desirable for the partner of the destination terminal.

For example, when a business availability determination table and a private availability determination table are registered in the management system 50, a user of the terminal 10 may select the business availability determination table for business purposes, and may select the private availability determination table for private purposes. Moreover, when one terminal 10 is used by a user, the user may select a suitable one of the availability determination tables for each of a business time zone and a private time zone. Hence, the user of the source terminal may be provided with a suitable transmit availability icon according to the situation.

Moreover, the availability determination table may be registered beforehand and a user may edit the contents of the availability determination table. Namely, the user may edit the suitable conditions and the unsuitable conditions for each of the time zone information, the place information and movement information, and the holiday information.

FIG. 24 is a diagram showing an example of a private availability determination table 5005B. It is assumed that the availability determination table 5005A of FIG. 10 is a business availability determination table. The suitable conditions in the private availability determination table 5005B of FIG. 24 are somewhat degraded from those of the business availability determination table 5005A of FIG. 10. Hence, a user of the source terminal may easily call a private user of the destination terminal.

Note that headquarters for private use, such as a user's house, may be registered as the headquarters in the private availability determination table 5005B of FIG. 24.

[Destination List Screen]

FIG. 25 is a diagram showing an example of a destination list screen which is displayed on the display 120 of the terminal 10aa as the source terminal. The destination list screen is displayed at step S34 in the process of FIG. 11.

As shown in FIG. 25, a situation (offline, in waiting, in meeting), a list of stations (a list of communication IDs), and a transmit availability icon 41 are displayed in the destination list screen. Note that the "in waiting" means the terminal 10 is in an online state. The user of the terminal 10aa may select a destination terminal to be called, by viewing the transmit availability icon 41. For example, the transmit availability icon 41 for the terminal 10 with the communication ID "01CA" is the "normal" indication, and the user of the source terminal 10 may determine that this destination terminal is to be called. On the other hand, the transmit availability icon 41 for the terminal 10 with the communication ID "01BA" is the "unsuitable" indication, and the user of the source terminal 10 may determine that this destination terminal is not to be called.

In this manner, when two or more destination candidates are displayed in the destination list screen, the user of the source terminal may select one of the destination candidates with a higher level of the availability.

As is apparent from the sequence diagram of FIG. 11, the destination list screen is displayed before the user of the source terminal selects a destination terminal, and the user of the source terminal may check the transmit availability icon 41 before selecting the destination terminal to be called.

Alternatively, the user of the source terminal may check the transmit availability icon 41 before a session is established. Moreover, the user of the source terminal may check the transmit availability icon 41 immediately after the user turns on the power switch 109 of the terminal 10. In a case in which the terminal 10 is a general-purpose information processing apparatus, the transmit availability icon 41 may be checked immediately after execution of the terminal program 1001 is started.

The destination list generating unit 20 displays the destination candidates which are sorted in ascending order or descending order of the transmit availability icons. Namely, the destination candidates may be displayed in order of the "suitable" indication, the "normal" indication, and the "unsuitable" indication, or the destination candidates may be displayed in order of the "unsuitable" indication, the "normal" indication, and the "suitable" indication. Hence, the user of the source terminal may easily select the destination terminal to be called.

When a user operates the manual operation button 108 to select the transmit availability icon or selects the transmit availability icon using the touch panel, the operation input receiving unit 12 receives the selection, and the destination list generating unit 20 changes the transmit availability icon to the time zone icon, the place icon, and the holiday icon. Note that the time zone icon, the place icon, and the holiday icon may be displayed with the transmit availability icon.

FIG. 26 is a diagram showing an example of a destination list screen in which a transmit availability icon is changed to a time zone icon, a place icon, and a holiday icon. In the destination list screen shown in FIG. 26, the "normal" indication of the transmit availability icon 41 indicated in FIG. 25 is changed to the time zone icon 42 indicating "during business hours", the place icon 43 indicating a "low-speed movement", and the holiday icon 44 indicating a "weekday". When the user operates the manual operation button 108 to touch any of the time zone icon 42, the place icon 43 and the holiday icon 44, only the transmit availability icon will appear again.

Note that, in a case of a destination candidate in the terminal management table, including the time zone information to which a flag is attached due to a low level of reliability of the time zone information, the time zone icon labeled "?" may be displayed.

The user may determine whether the destination candidate is to be called, by checking the details of the transmit availability icon 41. For example, when the place icon 43 indicates that the partner of the destination terminal is during movement, the holiday icon 44 indicates a weekday, and the time zone icon 42 indicates that the current local time is in business hours, the user may determine that the destination candidate is to be called.

The user of the source terminal may detect the environment information for each of the destination candidates, and the user may communicate with the partner by taking into consideration the partner's situation. For example, when the current local time of the destination candidate is in overtime work hours, the user may quickly finish communications with the partner not to prolong the partner's work, and when the terminal of the destination candidate is during a high speed movement, the user may quickly finish communications because the likelihood that the partner is moving by a public transit system is high.

In the example of FIG. 26, the transmit availability icon, which is initially displayed, is changed to the time zone icon, the place icon, and the holiday icon in the destination list screen. Alternatively, the time zone icon, the place icon, and the holiday icon may be initially displayed. Namely, the time zone icon, the place icon, and the holiday icon may be displayed without displaying the transmit availability icon. Or, before displaying the transmit availability icon, the time zone icon, the place icon, and the holiday icon may first displayed. Hence, the user may check the details of the partner's situation of the destination terminal immediately when the destination list screen is displayed.

Note that, when the time zone icon 42, the place icon 43, and the holiday icon 44 are displayed for each of two or more destination candidates in the destination list screen, the destination list generating unit 20 may display a list of the destination candidates which are sorted in ascending order or descending order of priority to which candidates one of the icons 42 to 44 is selectively assigned by the user. For example, if the user assigns the time zone icon 42 to the priority of the sorting, destination candidates with the time zone information indicating the current local time is in business hours may be preferentially displayed in the destination list screen. If the user assigns the place icon 43 to the priority of the sorting, destination candidates with the place information indicating the current place is the headquarters may be preferentially displayed in the destination list screen. If the user assigns the holiday icon 44 to the priority of the sorting, the destination candidates with the holiday information indicating the current date is a weekday may be preferentially displayed in the destination list screen.

Alternatively, rather than displaying the destination list screen with the time zone icon, the place icon, and the holiday icon, the destination list screen may be displayed with respective text data of the current local time, the place information, the holiday information, and the moving speed which are registered in the terminal management table.

FIG. 27 is a diagram showing an example of a destination list screen in which destination candidates are sorted according to the local time. In the example of FIG. 27, destination candidates (communication IDs: 01CA, 01CB) with the time zone information indicating the current local time is in business hours are displayed in preference to a destination candidate (communication ID: 01BA) with the time zone information indicating the current local time is overtime. Hence, the user of the source terminal may easily select the destination terminal with which the current local time is in business hours from the destination list screen.

Alternatively, rather than giving priority to destination candidates with which the current local time is in business hours, a list of destination candidates sorted in ascending order or descending order of the current local time may be displayed. In such a case, the user of the source terminal may easily select the destination terminal with which the current local time is near to that of the source terminal.

[Modifications]

Although the embodiments of the invention have been described in the foregoing, the transmission system according to the invention is not limited to the above-described embodiments, and variations and modifications may be made without departing from the scope of the present invention.

For example, in the foregoing embodiment, the management system 50 includes the terminal management table. Alternatively, each of the transmission terminals in the transmission system may include the terminal management table. In such a case, even if the management system 50 does not exist, each transmission terminal 10 may display the transmit availability icon of the destination list screen according to the embodiment.

In the above-described embodiment, the time zone icon 42 is displayed in the destination list screen. Alternatively, the local time of the country or area where the destination terminal is situated may be displayed directly without generating the time zone icon 42 from the local time.

In the above-described embodiment, it is assumed that the time zone icon 42, the place icon 43, and the holiday icon 44 are transmitted from the management system 50 to the source terminal together with the transmit availability icon 41. Alternatively, one or more of the time zone icon 42, the place icon 43, and the holiday icons 44 may be transmitted without transmitting the transmit availability icon 41.

In the availability determination table shown in FIG. 10, the place information and the movement information are combined in one item and the place icon 42 is determined. Alternatively, the suitability of the movement information which is separate from the suitability of the place information may be determined.

Note that the functions or units of the management system 50 shown in FIG. 4 may be spread over two or more information processing apparatuses. Similarly, the storage unit 5000 of the management system 50 may be installed anywhere in the communication network 2.

Note that two or more management systems 50 may exist in the communication network 2.

As described in the foregoing, according to the transmission system of the present invention, a user of the source transmission terminal may take into consideration a current situation of a current place of the destination transmission terminal, in advance, and determine the suitability of calling a partner of the destination transmission terminal.

The transmission terminal according to the present invention may be implemented in any convenient form, for example, using dedicated hardware, or a mixture of dedicated hardware and software. The transmission system according to the present invention may be implemented as computer software implemented by one or more networked processing apparatuses. The network may comprise any conventional terrestrial or wireless communication network, such as the Internet. The processing apparatuses may comprise any suitably programmed apparatuses such as a general-purpose computer, a personal digital assistant, a mobile telephone (such as a WAP or 3G-compliant phone) and so on. Since the transmission system and terminal according to the present invention may be implemented as software, each and each aspect of the present invention thus encompasses computer software implementable on a programmable device.

The computer software may be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, and a network device depending on the type of the apparatus. Alternatively, the HDD may be provided external to the apparatus as long as the HDD is accessible from the apparatus. In this example, the CPU, such as a cache memory of the CPU, and the RAM may operate as a physical memory or a primary memory of the apparatus, while the HDD may operate as a secondary memory of the apparatus.

The present application is based upon and claims the benefit of priority of Japanese Patent Application No. 2014-165999, filed on Aug. 18, 2014, the contents of which are incorporated herein by reference in their entirety.

What is claimed is:

1. A transmission system comprising one or more processors configured to cause a source transmission terminal to transmit data to a destination transmission terminal, the one or more processors configured to execute:
   receiving availability information which is generated based on a current place of a destination candidate;
   displaying the availability information on a display to allow a user to determine whether transmitting the data to a destination transmission terminal associated with the destination candidate is appropriate;
   receiving a selection of the destination candidate corresponding to the availability information which is displayed; and
   transmitting the data to the destination transmission terminal associated with the destination candidate the selection of which is received by the receiving the selection of the destination candidate,
   wherein:
   the displaying is configured to display the availability information on the display before the receiving of a selection of the destination candidate receives the selection of the destination candidate,
   the one or more processors are further configured to execute generating the availability information by analyzing two or more availability factors comprehensively,
   the receiving availability information receives the availability factors analyzed for the generation of the availability information,
   the displaying displays the availability factors with the availability information or instead of the availability information, and
   the generating the availability information evaluates suitability of calling the destination candidate for each of the availability factors and generates the availability information by analyzing comprehensively the suitability of calling the destination candidate for each of the availability factors.

2. The transmission system according to claim 1, wherein:
   the receiving of availability information receives the availability factors from the destination transmission terminal associated with the destination candidate;
   the receiving of availability information receives again the availability factors from the destination transmission terminal when the availability factors are updated, or receives the availability factors from the destination transmission terminal at intervals of a predetermined period of time after the availability factors are last received; and the generating the availability information generates the availability information by analyzing the newly received availability factors comprehensively.

3. The transmission system according to claim 1, wherein the generating the availability information evaluates the suitability of calling the destination candidate for each of the availability factors, and generates the availability information by analyzing comprehensively the suitability for each of the availability factors to which weighting factors are assigned respectively.

4. The transmission system according to claim 1, wherein:

the generating the availability information evaluates the suitability of calling the destination candidate for each of the availability factors by making reference to one of two or more evaluation information tables, and the generating the availability information evaluates the suitability of calling the destination candidate for each of the availability factors by changing the one of the evaluation information tables to another and making reference to said other of the evaluation information tables.

5. The transmission system according to claim 4, wherein:

the availability factors include local time information of the destination candidate, and the generating the availability information determines that calling the destination candidate is appropriate when a current local time of the destination candidate indicated by the local time information is within a predetermined time range.

6. The transmission system according to claim 4, wherein:

the availability factors include place information of the destination candidate, and the generating the availability information determines that calling the destination candidate is appropriate when a local place of the destination candidate indicated by the place information is within a predetermined range from a position registered beforehand.

7. The transmission system according to claim 4, wherein:

the availability factors include information indicating whether a current local time in a country or an area of the destination candidate is a holiday or a weekday, and the generating the availability information evaluates the suitability of calling the destination candidate depending on whether the one of the evaluation information tables registered indicates that calling the destination candidate on either a holiday or a weekday is appropriate.

8. The transmission system according to claim 4, wherein:

the availability factors include information indicating whether the destination candidate is undergoing a movement, and the generating the availability information evaluates the suitability of calling the destination candidate depending on whether the information indicates that the destination candidate is undergoing a movement.

9. The transmission system according to claim 5, wherein:

the one or more processors are further configured to execute receiving the local time information which includes, as the local time information, time information of a position measured by a global positioning system, or time information distributed by a mobile communication network.

10. The transmission system according to claim 9, further comprising an information processing apparatus which connects the source transmission terminal and the destination transmission terminal associated with the destination candidate, wherein the receiving the local time information of the destination transmission terminal uses position information of the information processing apparatus received from the destination transmission terminal.

11. The transmission system according to claim 1, wherein the displaying displays a list of two or more destination candidates sorted in ascending or descending order of priority indicated by the availability information or one of the availability factors.

12. The transmission system according to claim 11, wherein the displaying displays a list of two or more destination candidates sorted in ascending order or descending order of priority indicated by a current local time in a country or an area of each of the destination transmission terminals associated with the destination candidates.

13. A transmission system comprising one or more processors configured to cause a source transmission terminal to transmit data to a destination transmission terminal, the one or more processors configured to execute:

receiving availability information which is generated based on a current place of a destination candidate;

displaying the availability information on a display to allow a user to determine whether transmitting the data to a destination transmission terminal associated with the destination candidate is appropriate;

receiving a selection of the destination candidate corresponding to the availability information which is displayed; and transmitting the data to the destination transmission terminal associated with the destination candidate the selection of which is received by the receiving the selection of the destination candidate, wherein:

the one or more processors are further configured to execute generating the availability information by analyzing two or more availability factors comprehensively, the receiving availability information receives the availability factors analyzed for the generation of the availability information, the displaying displays the availability factors with the availability information or instead of the availability information, and the generating the availability information evaluates suitability of calling the destination candidate for each of the availability factors and generates the availability information by analyzing comprehensively the suitability of calling the destination candidate for each of the availability factors.

14. A transmission terminal comprising one or more processors configured to control the transmission terminal as a source transmission terminal to transmit data to a destination transmission terminal, the one or more processors configured to execute:

receive receiving availability information which is generated based on a current place of a destination candidate;

displaying the availability information on a display to allow a user to determine whether transmitting the data to a destination transmission terminal associated with the destination candidate is appropriate;

receiving a selection of the destination candidate corresponding to the availability information which is displayed; and transmitting the data to the destination transmission terminal associated with the destination candidate the selection of which is received by the receiving the selection of the destination candidate, wherein:

the displaying is configured to display the availability information on the display before the receiving of a selection of the destination candidate receives the selection of the destination candidate, the one or more processors are further configured to execute generating the availability information by analyzing two or more availability factors comprehensively, the receiving availability information receives the availability factors analyzed for the generation of the availability information, the displaying displays the availability factors with the availability information or instead of the availability information, and the generating the availability information evaluates suitability of calling the destination candidate for each of the availability factors and generates the availability information by analyzing comprehensively the suitability of calling the destination candidate for each of the availability factors.

15. A transmission method of transmitting data from a source transmission terminal to a destination transmission terminal, comprising:

receiving availability information which is generated based on a current place of a destination candidate;

displaying the availability information on a display to allow a user to determine whether transmitting the data to a destination transmission terminal associated with the destination candidate is appropriate;

receiving a selection of the destination candidate corresponding to the displayed availability information; and transmitting the data to the destination transmission terminal associated with the destination candidate the selection of which is received, wherein:

the displaying is configured to display the availability information on the display before the receiving of a selection of the destination candidate receives the selection of the destination candidate, the method further comprises generating the availability information by analyzing two or more availability factors comprehensively, the receiving availability information receives the availability factors analyzed for the generation of the availability information, the displaying displays the availability factors with the availability information or instead of the availability information, and the receiving of availability information receives the availability information which has been generated by evaluating a suitability of calling the destination candidate for each of the availability factors and generated by analyzing comprehensively the suitability of calling the destination candidate for each of the availability factors.

* * * * *